US010289917B1

United States Patent
Fu et al.

(10) Patent No.: US 10,289,917 B1
(45) Date of Patent: May 14, 2019

(54) SENSOR TO CHARACTERIZE THE BEHAVIOR OF A VISITOR OR A NOTABLE EVENT

(71) Applicant: Kuna Systems Corporation, Burlingame, CA (US)

(72) Inventors: Sai-Wai Fu, Los Altos, CA (US); Haomiao Huang, Redwood City, CA (US); Harold G. Sampson, Sunnyvale, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 610 days.

(21) Appl. No.: 14/519,642

(22) Filed: Oct. 21, 2014

Related U.S. Application Data

(60) Provisional application No. 61/902,943, filed on Nov. 12, 2013.

(51) Int. Cl.
| | | |
|---|---|---|
| *G06K 9/00* | (2006.01) | |
| *H04N 7/18* | (2006.01) | |
| *G08B 13/196* | (2006.01) | |
| *G08B 15/00* | (2006.01) | |

(52) U.S. Cl.
CPC ....... *G06K 9/00771* (2013.01); *G08B 13/196* (2013.01); *G08B 13/19606* (2013.01); *H04N 7/18* (2013.01); *G08B 15/00* (2013.01); *H04N 7/183* (2013.01)

(58) Field of Classification Search
CPC ........ G08B 13/19602; G08B 13/19606; G08B 13/19608; G08B 13/1961; G08B 13/19613; G08B 13/196; G08B 13/19615; G06K 9/00771; H04N 7/18
See application file for complete search history.

(56) References Cited

U.S. PATENT DOCUMENTS

| | | | | |
|---|---|---|---|---|
| 8,879,789 | B1 * | 11/2014 | Figov ............... | G08B 13/19602 382/103 |
| 9,728,077 | B1 * | 8/2017 | Fu ......................... | G08B 29/185 |
| 2002/0005894 | A1 * | 1/2002 | Foodman ............ | G06F 17/3089 348/143 |
| 2002/0135484 | A1 * | 9/2002 | Ciccolo ............ | G08B 13/19613 340/573.1 |

(Continued)

FOREIGN PATENT DOCUMENTS

JP 2000331254 A * 11/2000 ............... H04N 7/18

OTHER PUBLICATIONS

Machine translation of JP 2000331254 A.*
"Canary: The first smart home security device for everyone", https://www.indiegogo.com/projects/canary-the-first-smart-home-security-device-for-everyone, pp. 1-21, Jul. 22, 2014.

(Continued)

*Primary Examiner* — David N Werner
(74) *Attorney, Agent, or Firm* — Christopher P. Maiorana, PC

(57) ABSTRACT

An apparatus comprising a first detection device, a second detection device and a processing circuit. The first detection device may be configured to generate a first signal in response to a first type of input. The second detection device may be configured to generate a second signal in response to a second type of input. The processing circuit may be configured to (i) determine whether the first signal is a known type of signal, (ii) determine whether the second signal is a known type of signal and (iii) generate a warning signal in response to the first signal and the second signal.

20 Claims, 17 Drawing Sheets

(56) References Cited

U.S. PATENT DOCUMENTS

| | | | | |
|---|---|---|---|---|
| 2005/0146605 A1* | 7/2005 | Lipton | ................ | G06F 17/3079 348/143 |
| 2005/0162515 A1* | 7/2005 | Venetianer | .......... | G06F 17/3079 348/143 |
| 2005/0169367 A1* | 8/2005 | Venetianer | ........ | G06F 17/30799 375/240.01 |
| 2006/0045185 A1* | 3/2006 | Kiryati | ............. | G08B 13/19602 375/240.16 |
| 2006/0045354 A1* | 3/2006 | Hanna | ................ | G06K 9/00771 382/224 |
| 2007/0013776 A1* | 1/2007 | Venetianer | ......... | G06K 9/00771 348/143 |
| 2007/0014439 A1* | 1/2007 | Ando | ................. | G06K 9/00771 382/118 |
| 2008/0129821 A1* | 6/2008 | Howarter | ............. | G08B 13/196 348/143 |
| 2010/0026802 A1* | 2/2010 | Titus | ................ | G08B 13/19608 348/143 |
| 2010/0205203 A1* | 8/2010 | Anderson | ........... | G06F 17/3079 707/769 |
| 2011/0007139 A1* | 1/2011 | Brunetti | ........... | G08B 13/19613 348/51 |
| 2014/0334684 A1* | 11/2014 | Strimling | ........... | G06K 9/00771 382/105 |

OTHER PUBLICATIONS

"DoorBot wireless doorbell cam lets you see visitors", http://www.cnet.com/news/doorbot-wireless-doorbell-cam-lets-you-see-visitors/, CNET, pp. 1-3, Dec. 7, 2012.

\* cited by examiner

SENSOR TO CHARACTERIZE THE BEHAVIOR OF A VISITOR OR A NOTABLE EVENT

This application relates to U.S. Provisional Application No. 61/902,943, filed Nov. 12, 2013, which is hereby incorporated by reference in its entirety.

FIELD OF THE INVENTION

The present invention relates to monitoring systems generally and, more particularly, to a method and/or architecture for a sensor to characterize the behavior of a visitor or a notable event.

BACKGROUND OF THE INVENTION

Conventional monitoring approaches provide simple alarm signals with minimal information to homeowners or business owners. Conventional alarm signals indicate (i) a door or a window has been opened (i.e., using contact sensors), (ii) a warm moving object about the size of a human has entered the premises (i.e., using a PIR motion detector), (iii) a smoke detector has been triggered, and (iv) a carbon monoxide (CO) detector has been triggered. Such alarm solutions are being practiced by prevalent alarm monitoring industry leaders. Conventional monitoring systems are primarily indoor solutions that are not effective as prevention tools because criminals are already inside the premises when alarms are activated. With conventional monitoring systems, criminals most likely will not be deterred from stealing and simply leave before the police arrive.

The disadvantages of conventional approaches are significant. The technology of conventional approaches is old (developed in 1970s). There are four major pain points that limit the usage of the old technology to about 20% of US households. The root cause of the problem is that the detection is done "indoor".

A first major pain point is that conventional approaches are hard to use. Homeowners have to arm and disarm alarm systems manually. Arming and disarming alarm systems on a daily basis is inconvenient. Homeowners often do not bother to arm monitoring systems. Many burglars know that most alarm systems are simply not used.

A second major pain point is that conventional approaches detect intruders and/or abnormal activities too late. The detection occurs after the unfortunate event has already happened. Intruders know they have time before police arrive. Intruders know that sometimes police do not respond.

A third major pain point is that conventional approaches have a very high false alarm rate (i.e., over 90%). The primary cause of high false alarm rates is user error. User error is often due to the difficulty of use of alarm systems (i.e., the first pain point). The second cause of high false alarm rates is equipment failure. By contract, homeowners are responsible for testing and/or maintaining the monitoring equipment. The alarm monitoring industry has little incentive to ensure the monitoring equipment functions properly. High false alarm rates discourage police response. Some cities (i.e., San Jose, Calif. and Fremont, Calif.) have publicly stated that police forces will not respond to security alarm calls unless the alarms are verified. Many alarm systems are not equipped with video surveillance to verify an alarm because the alarm monitoring industry charges high fees to install and monitor the video surveillance in a home. In addition, indoor video surveillance causes privacy concern among most homeowners.

A fourth major pain point of conventional approaches is cost. Monitoring systems from the alarm monitoring industry require multi-year contracts. Multi-year contracts are used because cost structure is high. The high cost structure (i.e., $1,500 per contract for a basic package) is due to the cost of direct sales and professional installation of monitoring equipment. The most efficient way to recover the high cost structure is to ask for a multi-year contract.

It would be desirable to implement a sensor to characterize the behavior of a visitor or a notable event.

SUMMARY OF THE INVENTION

The present invention concerns an apparatus comprising a first detection device, a second detection device and a processing circuit. The first detection device may be configured to generate a first signal in response to a first type of input. The second detection device may be configured to generate a second signal in response to a second type of input. The processing circuit may be configured to (i) determine whether the first signal is a known type of signal, (ii) determine whether the second signal is a known type of signal and (iii) generate a warning signal in response to the first signal and the second signal.

The objects, features and advantages of the present invention include providing a monitoring system that may (i) characterize behavior of a visitor, (ii) characterize behavior of a notable event, (iii) prevent and/or reduce false alarm rates, (iv) monitor a perimeter of a premises, (v) send event notifications and/or warnings to a user, (vi) respond to user commands, (vii) perform event responses based on an urgency level and/or (viii) be cost effective to implement.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

To provide safety and/or peace of mind, homes and/or businesses should implement effective security systems. However, some estimates indicate 80% of households do not have security systems suggesting that the market may be underserved. The present invention may be a key contributor to expand the security protection of 20% households to over 50% of households. The present invention may be a disruptor to the current $17B home alarm service industry. The present invention may lead to a cost reduction from conventional providers to save consumers several billion dollars per year.

Figure 1:
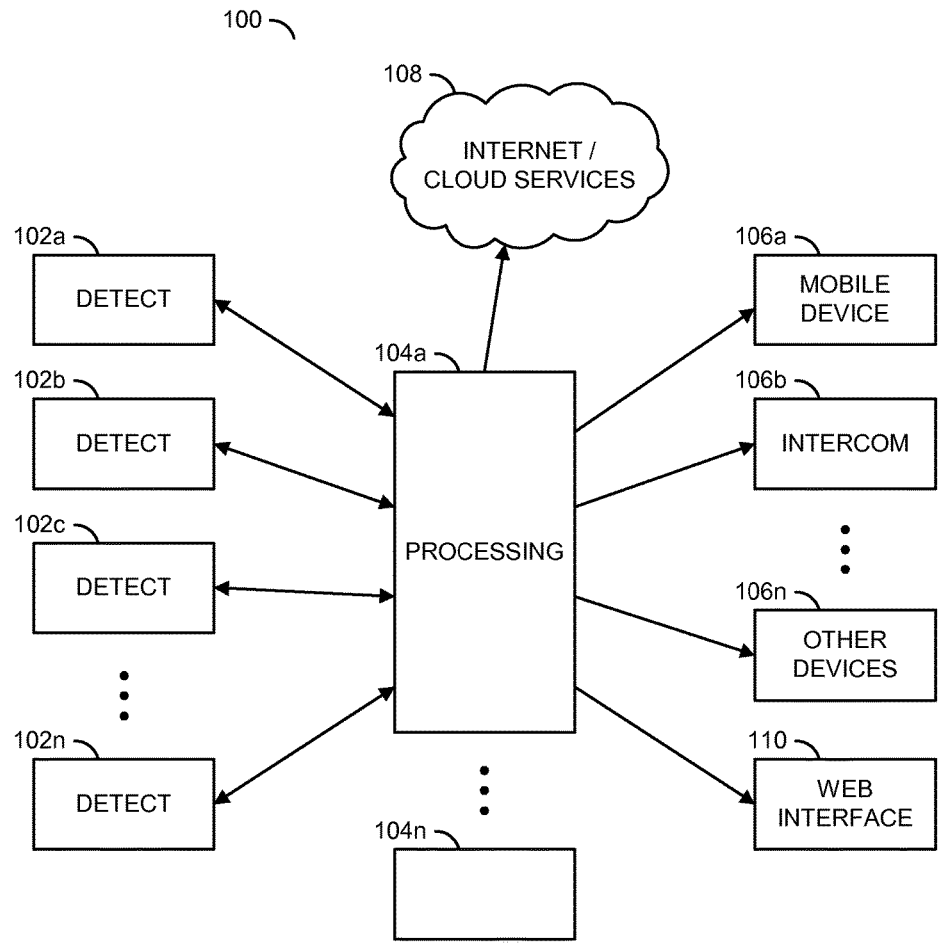
FIG. 1 is a diagram of a system in accordance with the invention.

Referring to FIG. 1, a block diagram of a system 100 is shown in accordance with a preferred embodiment of the present invention. The system 100 generally comprises a set (e.g., 2-6 or more) of detectors 102a-102n, a number of blocks (or circuits) 104a-104n, a number of blocks (or circuits) 106a-106n, a block (or circuit) 108 and a block (or circuit) 110. The detectors may be implemented as smart cameras and/or other sensors 102a-102n. The circuits 106a-106n may be interface devices. For example, the interface device 106b is shown implemented as a companion intercom for effective voice communication (e.g., two-way audio). The circuit 108 may be internet and/or cloud services. The circuit 110 may be a web interface. The web interface 110 may allow a user to send data to the internet/cloud services 108.

The smart cameras 102a-102n may be implemented as indoor detection devices and/or outdoor detection devices. For example, the smart cameras 102a-102n may be mounted discreetly around a perimeter of a premises (e.g., a home and/or a business property). In another example, the smart cameras 102a-102n may be implemented as an indoor camera mounted to look outside of a premises through a window. The type, number and/or mounting location of the smart cameras 102a-102n may be varied according to the design criteria of a particular implementation. The smart cameras 102a-102n may implement sensor technology. In some embodiments, the smart cameras 102a-102n may comprise a two-way intercom.

The detectors 102a-102n may receive input signals from images of people, sounds (e.g., from a doorbell, smoke alarm, window breaking, dog barking, etc.), vibration of windows, touch (e.g., from door knobs, electricity power panel, etc.) and/or smell (e.g., alcohol, gun powder, etc.). In some embodiments, the detectors 102a-102n may be integrated with an outdoor light fixture and/or an indoor light fixture. The detectors 102a-102n may be implemented as a pressure sensor, a RFID transmitter/receiver and/or a contact sensor. The sensor signals may include images, sound, touch, RFID, smell, etc. Signals detected by the system 100 may comprise doorbell signals (e.g., detected at audio frequencies inside and/or outside the human hearing range), life-saving alarm signals (e.g., smoke detector, CO detector, etc.), window breaking (e.g., contact sensors and/or audio sensors) and/or dog barking, etc.

The system 100 may intelligently combine signals from the detectors 102a-102n. The system may be configured to predict the behavior of visitors. The processing blocks 104a-104n may be implemented, in one example, as a single chip solution. The processing circuits 104a-104n may be implemented as peer-to-peer (e.g., mesh network) devices and/or master-slave devices. The processing blocks 104a-104n may generate a signal (e.g., a warning signal) in response to input signals and/or data from the detectors 102a-102n. For example, the detector 102a may send a signal to the processing block 104a and the processing block 104a may interpret the signal (e.g., determine whether the input signal is a known signal) and/or generate a response.

The processing blocks 104a-104n may be connected to the internet/cloud services 108. The interface devices 106a-106n may also be connected to the internet/cloud services 108. The interface devices 106a-106n may be connected to the internet/cloud services 108 directly and/or indirectly through the processing blocks 104a-104n. For example, the interface device 106a may be a mobile device (e.g., a smartphone, a tablet computing device, a smart watch, etc.) directly connected to the internet/cloud services 108. In another example, the interface device 106b may be an intercom (e.g., a two-way intercom) indirectly connected to the internet/cloud services 108 through the processing blocks 104a-104n. The interface devices 106a-106n may provide security and/or deterrent features. The interface devices 106a-106n may be deterrent devices. For example, one of the interface devices 106a-106n may be a pepper spray deterrent device. In another example, one of the interface devices 106a-106n may be a tear gas deterrent device. The number, type and/or connectivity of the interface devices 106a-106n may be varied according to the design criteria of a particular implementation.

The system 100 may combine multiple sensory signals (e.g., from the detection devices 102a-102n) to accurately characterize the behavior of a visitor. Characterization of the behavior of the visitor may be performed and/or presented to home/business owners in real time. For example, categorizations of the behavior of visitors may comprise the behavior typical of potential burglars, solicitors, delivery workers, residents, domestic helpers, strangers, friendly visitors with and/or without access to the premises, etc. The number and/or type of behavior categorizations may be varied according to the design criteria of a particular implementation.

The home/business owner and/or a monitoring service may respond and/or select one or more responses to a situation/event based on the transmitted characterization information from the system 100. For example, the response (e.g., sounding an alarm, talking to the intruder, flashing lights, etc.) may prevent undesirable events (e.g., burglaries, fire, vandalism, etc.). The characterization information may be accumulated in the cloud storage devices/services 108 for review and/or be used as forensic evidence for a future situation/event analysis.

Figure 2:
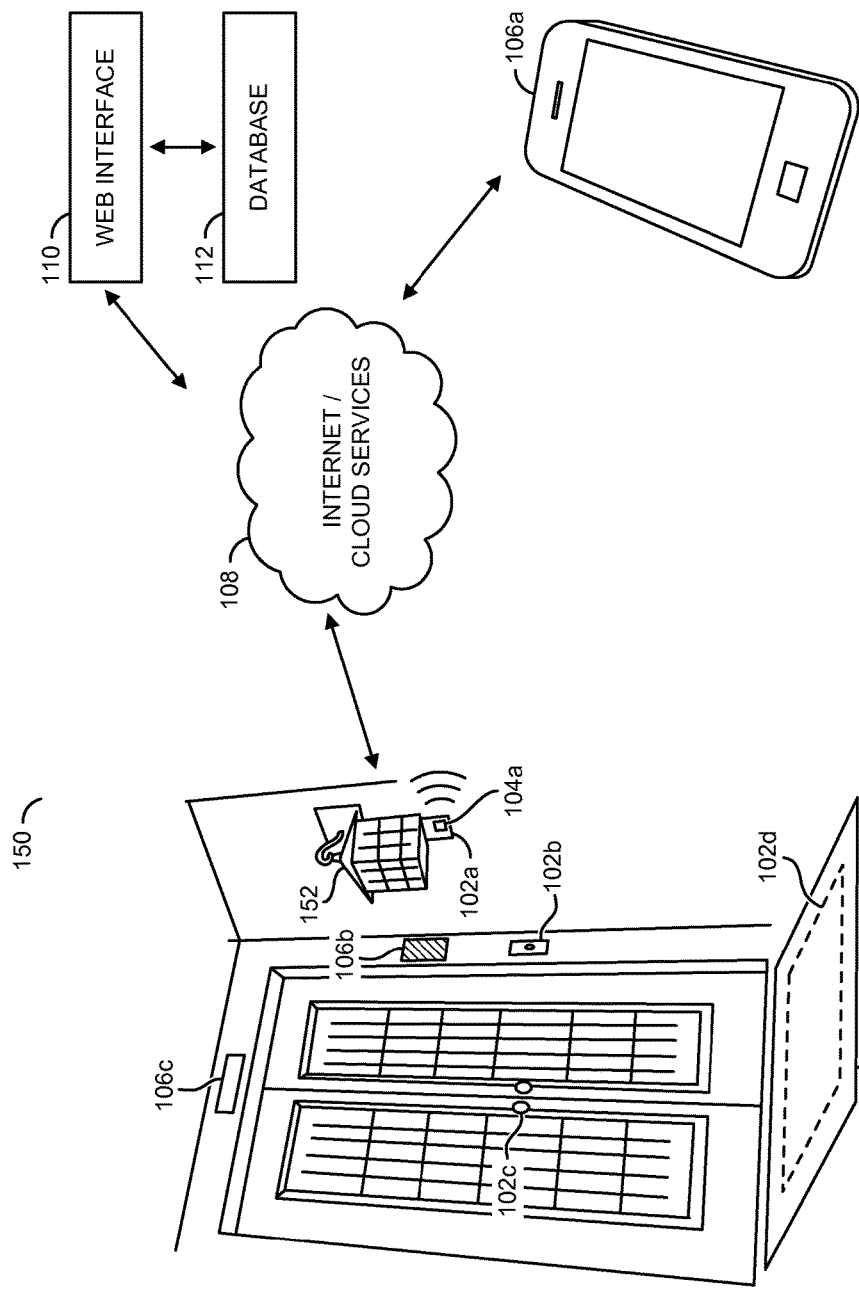
FIG. 2 is a diagram of an example embodiment of the system monitoring an access point.

Referring to FIG. 2, a diagram of an example embodiment 150 is shown. The embodiment 150 generally comprises the smart camera 102a, a doorbell sensor 102b, a door knob sensor 102c, a pressure sensor 102d, the processing circuit 104a, the smartphone 106a, the intercom 106b, a deterrent device 106c, the internet/cloud services 108, the web interface 110, a block (or circuit) 112, a light fixture 152 and a welcome mat 154. The circuit 112 may be a database. The example embodiment 150 may implement detection devices (e.g., 102a-102d) monitoring an access point of a premises (e.g., a home and/or business).

The smart camera 102a may detect and/or record image and/or video signals. The smart camera 102a may send the input signal (e.g., image and/or video) to the processing circuit 104*a*. The smart camera 102*a* may be mounted discreetly on the light fixture 152. The doorbell sensor 102*b* may detect and/or monitor for audio signals from the doorbell (e.g., whether a visitor has rung the doorbell). The door knob sensor 102*c* may detect and/or monitor for contact (e.g., whether a visitor has touched the door knob). The pressure sensor 102*d* may detect and/or monitor for pressure on the welcome mat 154 (e.g., whether a visitor has stood on the welcome mat 154). The detection devices 102*a*-102*d* may generate a known type of signal. The processing circuit 104 may generate a signal (e.g., a warning signal) in response to the known type of signal and/or signals from the detection devices 102*a*-102*d*.

The processing circuit 104*a* is shown as part of the smart camera 102*a*. In some embodiments, each of the detection devices 102*a*-102*n* may have a corresponding processing circuit. In some embodiments, each of the detection devices 102*a*-102*n* may communicate with a single processing circuit (e.g., the processing circuit 104*a*). The processing circuit 104*a* is shown communicating wirelessly with the internet/cloud services 108. The processing circuit 104*a* may communicate with the smartphone 106*a* through the internet/cloud services 108 and/or directly (e.g., using Bluetooth, ZigBee, etc.).

The smartphone 106*a* may be configured to communicate with the processing circuit 104*a*. The smartphone 106*a* may be configured to receive information from the detection devices 102*a*-102*d*. For example, the user may view recorded and/or live streaming video from the smart camera 102*a* using the smartphone 106*a*. In another example, the user may receive alerts and/or notifications (e.g., the warning signal) about events and/or visitors. The user may send commands to the system 100 using the smartphone 106*a* (e.g., to perform a response to an event).

The intercom 106*b* may be configured to send/receive audio signals. The intercom 106*b* may be configured to allow a visitor to communicate with the user. For example, the visitor may speak to the intercom 106*b* and the user may listen to the visitor using the smartphone 106*a*. In another example, the user may speak to the smartphone 106*a* and the visitor may listen to the user using the intercom 106*b*. The intercom 106*b* may be configured to playback pre-recorded audio messages.

The deterrent device 106*c* may be configured to perform various actions to prevent access to the premises by an unwelcome visitor. For example, the deterrent device 106*c* may be a siren (e.g., a siren device compliant with one or more applicable local regulations and/or standards). In another example, the deterrent device 106*c* may emit tear gas. In yet another example, the deterrent device 106 may emit pepper spray. In still another example, the deterrent device 106 may be a strobe light configured to flash at a particular frequency to disorient the unwelcome visitor and/or transmit a message (e.g., using Morse code). The type of deterrent device 106*c* and/or action performed by the deterrent device 106*c* may be varied according to the design criteria of a particular implementation.

The warning signal may be generated by the processing circuits 104*a*-104*n* and transmitted to the deterrent device 106*c*. Based on the warning signal, the deterrent device 106*c* may perform a response. The response may be selected based on user-defined preferences. For example, the deterrent device 106*c* may be configured to perform multiple functions. The user may select various functions to perform based on the type of warning signal generated by the processing circuits 104*a*-104*n*. In some embodiments, the function performed by the deterrent device 106*c* may be automatically performed when the warning signal is received. In other embodiments, the deterrent device 106*c* may wait for a user response before performing a function.

The database 112 may store data. The database 112 may be accessible through the web interface 110 (e.g., using the smartphone 106*a*, a desktop computer, a tablet computing device, etc.). The database 112 may store recordings from the detection devices 102*a*-102*d*. For example, the database 112 may store recorded video and/or captured images from the smart camera 102*a*. In another example, the database 112 may store a history of data received by the doorbell sensor 102*b* (e.g., a timestamp associated with each audio signal detected by the doorbell sensor 102*b*). The database 112 may be stored on the user device 106*a* and/or stored externally (e.g., in cloud storage provided by a monitoring services, etc.). The type and/or arrangement of data stored in the database 112 may be varied according to the design criteria of a particular implementation.

In some embodiments, the database 112 may store pre-recorded audio messages. An appropriate pre-recorded message may be selected from a collection of audio messages stored in the database 112. The audio message may be selected based on the warning signal generated by the processing circuits 104*a*-104*n* and/or by a selection made by the user (e.g., using the smartphone 106*a*). The audio message may be played through the intercom 106*b*. Audio messages may be pre-recorded by a user and/or a manufacturer. For example, the audio message may be a recording of a human voice, music, an alarm, a barking dog, pleasant/welcoming sounds and/or scary/deterring sounds.

The system 100 may be configured to address issues and/or shortcomings of conventional alarm systems and/or monitoring services. For example, the system 100 may be configured to address pain points of conventional alarm systems such as difficulty of use, late detection of intruders, high false alarm rates and/or high cost.

The system 100 may be configured to be easy to use. The system 100 may be configured to monitor the perimeter of the premises. For example, outdoor sensors may be configured to detect visitors at the perimeter of the premises. Generally, homeowners and/or friendly visitors do not linger and/or loiter at the perimeter of a home. By monitoring the perimeter of the premises, the system 100 may be active all the time (e.g., there is no need to manually arm/disarm the system 100). Eliminating the need to arm/disarm the system 100 may improve the ease of use of the alarm/monitoring service.

The system 100 may be configured to prevent intrusion. For example, intruders may be detected before entering the premises (e.g., to avoid the late notification problem). The system 100 may be configured to monitor outdoor sensors (e.g., the detectors 102*a*-102*n*). The detectors 102*a*-102*n* may be configured to generate alerts and/or alarms before the intruder enters the premises. In addition, the system 100 may be configured to allow homeowners and/or a monitoring service to inquire and/or "talk down" potential intruders. For example, the intercom 106*b* may be configured as a two-way radio/intercom to enable the homeowner to speak with the intruder. The combination of early alarms and/or pro-active responses (e.g., "talking down" intruders, potential deterrents, etc.) may prevent intrusion.

Figure 3:
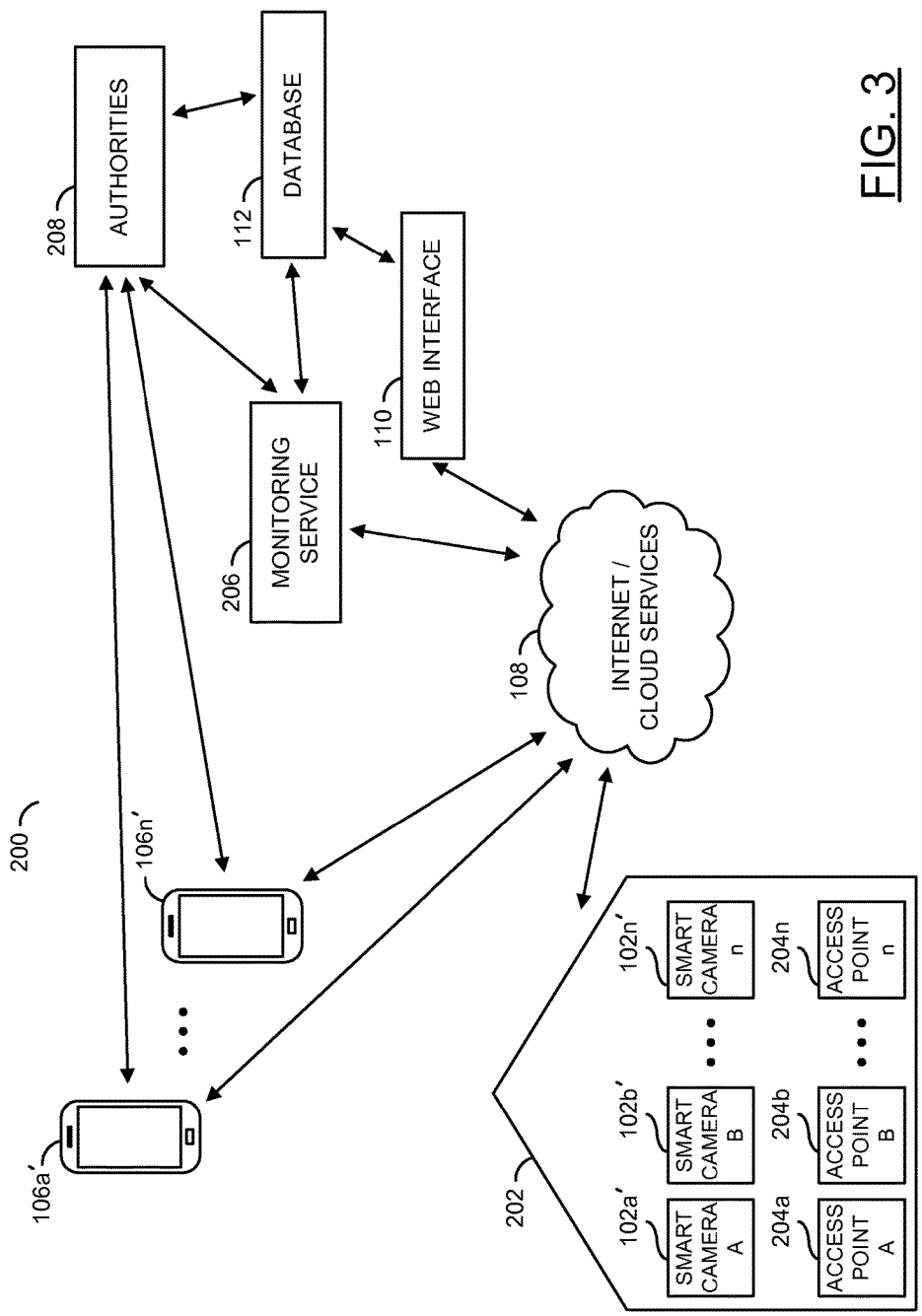
FIG. 3 is a diagram of an example embodiment of the system monitoring a perimeter of a premises.

Referring to FIG. 3, an example embodiment 200 is shown. The example embodiment 200 may be the system 100 monitoring a perimeter of a premises. The example embodiment 200 generally comprises the detection devices 102*a*'-102*n*' (e.g., smart cameras), the interface devices 106a'-106n' (e.g., smartphones), the Internet/cloud services 108, the web interface 110, the database 112, a premises 202, access points 204a-204n, a monitoring service 206 and/or authorities 208.

The premises 202 may be a residential home and/or a business building. The premises 202 is shown having access points 204a-204n. Each of the access points 204a-204n is shown having an associated smart camera 102a'-102n'. While each of the access points 204a-204n is shown having an associated smart camera 102a'-102n', the access points 204a-204n may have multiple smart cameras and/or other type of the detection devices 102a-102n (e.g., the doorbell sensor 102b, the door knob sensor 102c, the pressure sensor 102d, etc.). Generally, the access points 204a-204n are monitored with a sufficient number and/or type of detection devices to reliably monitor the perimeter of the premises 202. The number and/or types of detection devices at each of the access points 204a-204n may be varied according to the design criteria of a particular implementation.

The system 100 may send/receive data between the smart cameras 102a'-102n' (and any associated processing circuits 104a-104n) and the internet/cloud services 108. The user may interact with the system 100 using one of the smartphones 106a'-106n'. In some embodiments, the smartphones 106a'-106n' may be used by a trusted neighbor and/or friend to monitor the premises 202.

Data from the detection devices (e.g., the smart cameras 102a'-102n') may be sent to the monitoring service 206 and/or the authorities 208. For example, the monitoring service 206 may provide monitoring and/or verification for a fee (e.g., a monthly subscription). The monitoring service 206 may monitor the premises 202 using the smartphones 106a'-106n'. The monitoring service 206 may verify signals received from the detection devices 102a'-102n'. Based on the verification of the signals, the monitoring service 206 may contact the authorities 208. The monitoring service 206 may ensure the detected signals do not represent a false alarm.

The authorities 208 may respond to verified alarms. The system 100 may ensure signals sent to the authorities 208 are not false alarms. The authorities 208 may access the database 112. Information from the database 112 may be used as forensic evidence by the authorities 208.

Figure 4:
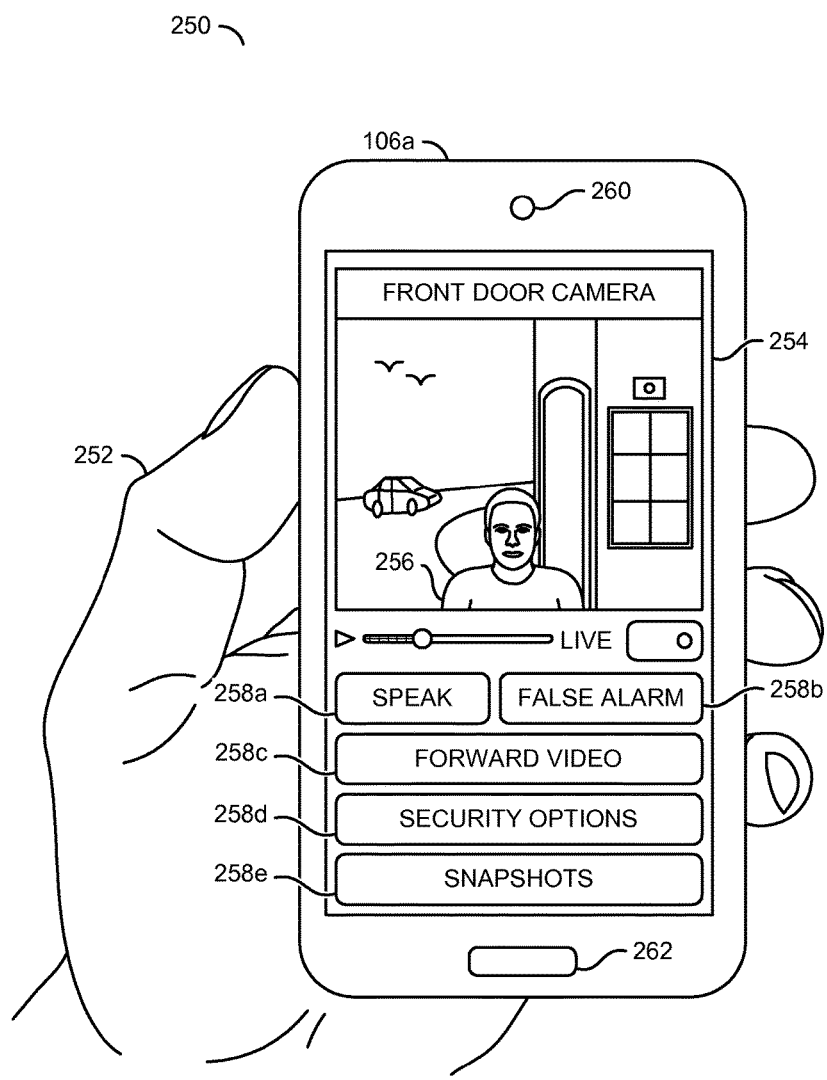
FIG. 4 is a diagram of an example embodiment of interacting with a detection device using an interface device.

Referring to FIG. 4 an example embodiment 250 is shown. The example embodiment 250 may be an example of interacting with a detection device using an interface device. The example embodiment 250 generally comprises the smartphone 106a (e.g., the interface device), a user 252, a video playback interface 254, a visitor 256, command interface options 258a-258e, a speaker 260 and/or a microphone 262.

The user 252 is shown holding the smartphone 106a. The smartphone 106a is shown displaying the video playback interface 254. The video playback interface 254 is shown displaying a video from the "front door camera" (e.g., the smart camera 102a). In one example, the video playback interface 254 may playback a recording (e.g., a stored video file) from the smart camera 102a. In another example, the video playback interface 254 may play a live stream from the smart camera 102a.

The visitor 256 is shown in the video on the video playback interface 254. The user 252 is provided with various command interface options 258a-258e. Using the command interface options 258a-258e the user 252 may provide a command to the system 100. The system 100 may perform a response based on the command provided by the user 252.

One of the command interface options 258a-258e may be a speak command 258a. The speak command 258a may allow the user 252 to speak to the visitor 256 in real-time. For example, the user 252 may speak to the microphone 262 and the intercom 106b may present the voice of the user 252 to the visitor 262. In another example, the visitor 256 may speak into the intercom 106b and the voice of the visitor 256 may be presented by the speaker 260 to the user 252. Using the speak command 258, the system 100 may be configured as a two-way audio communication device.

One of the command interface options 258a-258e may be a false alarm command 258b. The false alarm command 258b may allow the user 252 to indicate a false alarm has been detected. For example, the visitor 256 may be a friend of the user 252. The system 100 may detect the visitor 256 and send a notification to the user 252. The user 252 may prevent an alarm being sent to the authorities 208 by selecting the false alarm command 258b.

One of the command interface options 258a-258e may be a forward video command 258c. The forward video command 258c may allow the user 252 to forward a recording of a video (e.g., recorded by the smart camera 102a) to another location. For example, the user 252 may forward the video recording to friends and/or neighbors (e.g., to warn of a potential burglar in the area). In another example, the user 252 may forward the video recording to the database 112 for long-term storage. In yet another example, the user 252 may forward the video recording to the monitoring service 206 and/or the authorities 208.

One of the command interface options 258a-258e may be a security options command 258d. The security options command 258d may provide the user 252 with various security options (e.g., open a sub-menu of options). The number and/or type of security options available may be determined by a monthly fee paid by the user 252 (e.g., to the monitoring service 206). The number and/or type of security options available may be determined by the type of sensors and/or the response devices installed by the user 252. For example, the user 252 may have an option to playback a pre-recorded audio message to the visitor 256 using the intercom 106b. In another example, the user 252 may have an option to sound a siren (e.g., a siren device compliant with one or more applicable local regulations and/or standards). In yet another example, the user 252 may have an option to flash a light bulb (e.g., in the light fixture 152 and/or the deterrent device 106c) at a particular frequency (e.g., 1 hertz) for varying durations such that a Morse code and/or a distress signal (e.g., "SOS") may be generated. In still another example, the user 252 may have an option to activate a tear gas and/or pepper spray device to drive away an unwelcome visitor. The type of security options may be varied according to the design criteria of a particular implementation.

One of the command interface options 258a-258e may be a snapshot command 258e. The snapshot command 258e may allow the user 252 to take a snapshot image of the video recording. The snapshot image may be a single image (e.g., a digital photograph image) and/or a video clip (e.g., a smaller portion of the video recording and/or live video stream). The snapshot image may provide a reduced file size of the video recording (e.g., to upload to the database 112, to email to a friend, upload to the cloud services 108, upload to YouTube, Vine, Vimeo, Facebook, Dailymotion and/or other video services, etc.).

The system 100 may be configured to prevent and/or reduce false alarms. The system 100 may implement video imaging as the primary detector of visitors. For example, one of the smart cameras 102a-102n may detect the visitor 256. The system 100 may be configured to allow the user to view video of the visitor 256 in real time using the mobile device 106b. The system 100 inherently provides verification of an intruder in real time before the alarm is sent to the police/authorities 208. For example, the mobile device 106a may provide an option for the user to notify the authorities 208. Generally, police forces preach prevention systems and respond to verified alarms. For example, a video recording of an event may provide verification for the authorities 208.

The system 100 may be affordable to users compared to conventional monitoring systems. The system 100 may be configured to eliminate high cost components of alarm monitoring services (e.g., long-term contracts and/or professional installation). The system 100 may be easy to install (e.g., suitable for do-it-yourself installation). Reducing high installation fees may allow the monitoring services 206 to be provided without long-term contracts.

The system 100 may implement sensor technology (e.g., the detectors 102a-102n) to classify visitors in real time. The user 252 may be alerted (e.g., by notifications sent to the mobile device 106a) of visitors based on the classification. Various sensor types may be implemented to determine a classification and/or behavior of the visitor 256.

The system 100 may implement sound detection (e.g., using the smart camera 102a and/or the intercom 106b). The system 100 may process and/or detect various audio signals (e.g., from the detectors 102a-102n located at various locations of the premises 202). The audio signals may be combined using sensor fusion technology. Based on the signals detected by the detectors 102a-102n, signals (e.g., a warning signal) may be generated by the processing circuits 104a-104n. The warning signal may be an intelligent signal providing a notification (e.g., "burglars present", "smoke detected", "suspicious sound detected", "image of visitor recorded", "temperature change detected", etc.).

The system 100 may implement touch sensors to generate silent signals. The silent signals may be presented to the central sensor system circuits 104a-104n to produce intelligent signals. In some embodiments, touch sensors alone may not provide sufficient information. Sounding an alarm without sufficient (e.g., verified) information may result in false alarms. Verification of information may be performed by the user 252 and/or based on other signals detected by the detectors 102a-102n.

The system 100 may be developed for burglary prevention. The system 100 may also provide convenience. For example, many homeowners do not want to physically be at a door (e.g., due to physical impairment, illness, safety concerns, being otherwise occupied, etc.) to greet friendly visitors and/or solicitors. The system 100 may be configured to allow homeowners to greet visitors using smartphones from anywhere.

Figure 5:
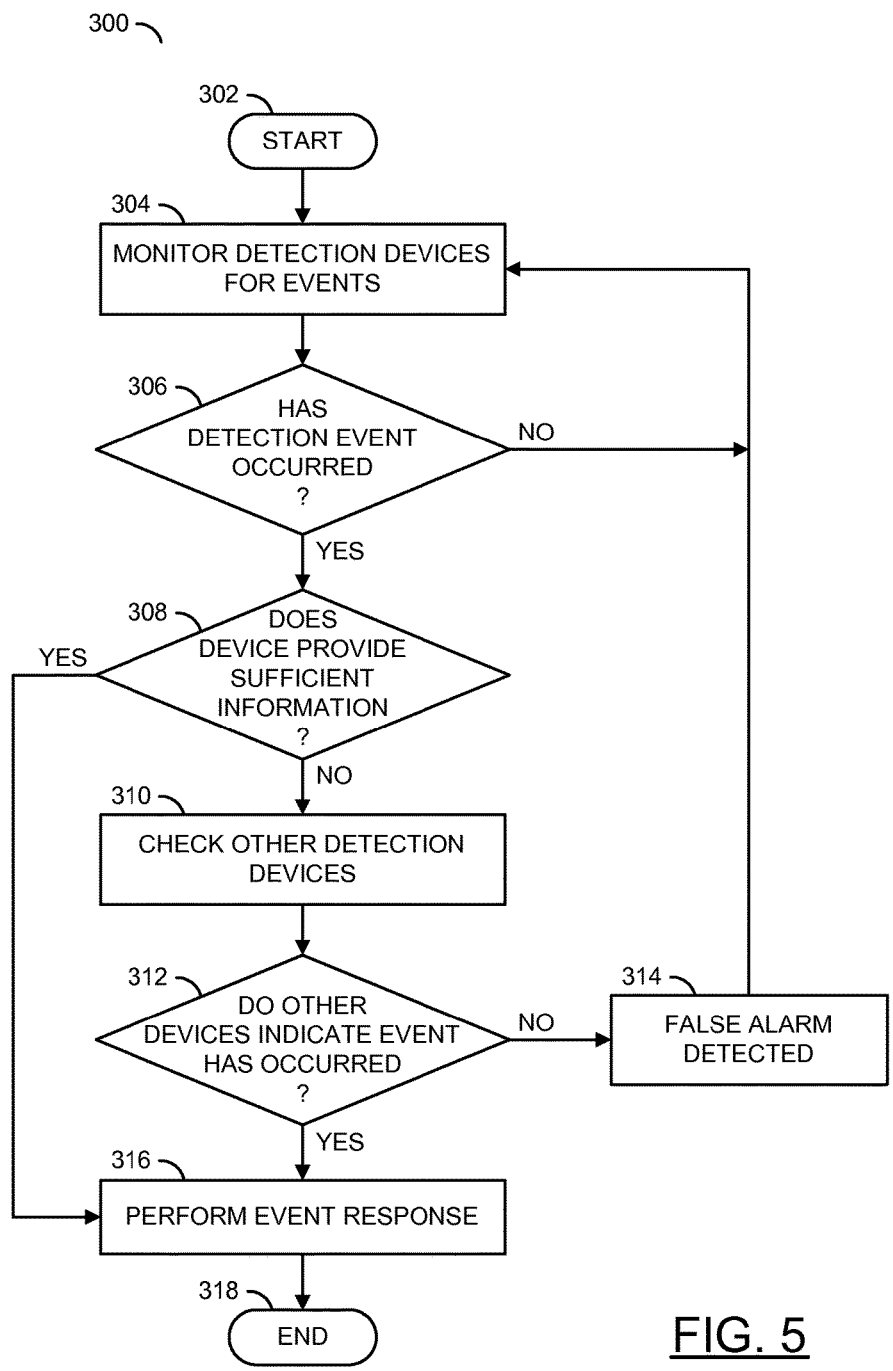
FIG. 5 is a flow diagram illustrating generating a response to one or more input signals.

Referring to FIG. 5, a flow diagram of a method (or process) 300 is shown. The method 300 may illustrate generating a response to one or more input signals. The method 300 generally comprises a step (or state) 302, a step (or state) 304, a decision step (or state) 306, a decision step (or state) 308, a step (or state) 310, a decision step (or state) 312, a step (or state) 314, a step (or state) 316, and a step (or state) 318. The state 302 may start the method 300. The state 304 may monitor the detection devices for events. Next, the method 300 may move to the decision state 306.

If the decision state 306 determines a detection event has not occurred, the method 300 may return to the state 304. If the decision state 306 determines a detection event has occurred, the method 300 may move to the decision state 308. If the decision state 308 determines the device does provide sufficient information, the method 300 may move to the state 316. If the decision state 308 determines the device does not provide sufficient information, the method 300 may move to the state 310.

The state 310 may check other detection devices. Next, the method 300 may move to the decision state 312. If the decision state 312 determines the other devices do not indicate an event has occurred, the method 300 may move to the state 314. The state 314 may indicate a false alarm has been detected. Next, the method 300 may return to the state 104. If the decision state 312 determines the other devices do indicate an event has occurred, the method 300 may move to the state 316. The state 316 may perform an event response. Next, the method 300 may move to the state 318, which ends the method 300.

The detection devices 102a-102n may monitor for events. Events may be based on information received by each of the detection devices 102a-102n and/or a combination of information received by one or more of the detection devices 102a-102n. For example, if one of the detection devices 102a-102n is a smoke detector, the event may be smoke being detected and/or a potential fire. In another example, if one of the detection devices 102a-102n is a smart camera and another is a PIR sensor, the event may be the arrival of a visitor (e.g., a visitor detected by the smart camera and the detection confirmed by information from the PIR sensor). In yet another example, an event may be a visitor first detected by one of the detection devices (e.g., the smart camera 102a') at a particular access point 204a (e.g., a front entrance) returning and being detected again by another one of the detection devices (e.g., the smart camera 102b') at a different access point 204b (e.g., a back entrance).

The system 100 may be configured to prevent false alarms. The system 100 may prevent false alarms by verifying the detected event. When a detected event is verified an event response may be performed. In some embodiments, one of the detection devices 102a-102n may provide sufficient information to verify an event. For example, if one of the detection devices 102a-102n is a CO detector and the CO detector detects a CO level above a particular threshold then sufficient information may have been detected to perform the event response (e.g., sound an alarm).

In some embodiments, one of the detection devices 102a-102n may not provide sufficient information to verify an event. If one of the detection devices 102a-102n does not provide sufficient information to verify the event, other detection devices 102a-102n may be checked. For example, if the pressure sensor 102d detects pressure on the doormat 154 then sufficient information may not be provided to perform an event response. The pressure detected by the pressure sensor 102d may indicate the presence of a household pet and/or a mail carrier and the user may have set preferences to not perform an event response for a detected pet and/or mail carrier. However, the pressure detected by the pressure sensor 102d may be a family member returning home and the user may want an event response to be performed for a detected family member. Since the pressure sensor 102d may not provide sufficient information to differentiate between a family member and a mail carrier, images from the smart camera 102a may be used to verify the event.

In some embodiments, the smart camera 102a may be configured to perform facial recognition to determine the identity of the visitor. In another example, facial recognition may be performed on a stored video recording/captured image by an application on the mobile device 106a and/or the cloud services 108. If one or more of the detection devices 102a-102n confirm and/or verify the event detected by another of the detection devices 102a-102n, the event response may be performed.

The event responses may be user-defined. For example, the user may pre-configure particular event responses based on an urgency level. The urgency level may be determined by the processing circuits 104a-104n based on the information detected by the detection devices 102a-102n. For example, if the urgency level indicates a burglar has been detected, the user may configure an event response setting to automatically contact the authorities 208. In another example, if the urgency level indicates a package has been delivered, the user may configure a setting to send a notification to the user. In some embodiments, the event responses may be commands entered by the user. For example, the user may select an event response using the command interface options 258a-258e. The number and/or type of event response settings may be varied according to the design criteria of a particular implementation.

In some embodiments, the event response may send a notification to the user. For example, the notifications may be sent to the mobile device 106a (e.g., a smartphone). In another example, the notifications may be sent to other types of user devices (e.g., a desktop computer, a tablet computing device, a smart watch, a security monitoring device, etc.).

Notifications may be configured to integrate with an operating system and/or operate as a program/application/executable file on a user device. For example, the notifications may utilize the Apple Push Notification service of the iOS operating system. In another example, the notifications may utilize the Google Cloud Messaging service for the Android operating system. Notifications may be sent using various protocols and/or services. For example, notifications may be sent as an email, voice message and/or text message (e.g., SMS).

The user may configure settings for a type of notification and/or alert received. In one example, notifications may be configured to appear aggressively (e.g., interrupt a current process on the mobile device 106a to display the notification, display as a pop-up, etc.). For example, a ringtone may be played when a new notification is received. In another example, notifications may be configured to appear unobtrusively (e.g., a small icon on the Status Bar of the Android operating system). For example, the mobile device 106a may vibrate when a new notification is received. The user may pre-define types of notifications based on the urgency level (e.g., an aggressive notification for a smoke alarm and/or an unobtrusive notification when a package is delivered).

The type of notification may be set according to a mode of the mobile device 106a (e.g., a silent mode, an airplane mode, do not disturb mode, etc.). In some embodiments, the notification may override the mode of the mobile device 106a. For example, the user may set the mobile device 106a to silent mode (e.g., the mobile device 106a is configured to not make sound) and an urgent notification may override the silent mode and generate a ringtone on the mobile device 106a (e.g., to notify the user of a burglar). The user may configure the types of events that may override settings of the mobile device 106a. The device used to receive notifications, the protocol used to receive notifications and/or a type of notification may be varied according to the design criteria of a particular implementation.

Figure 6A:
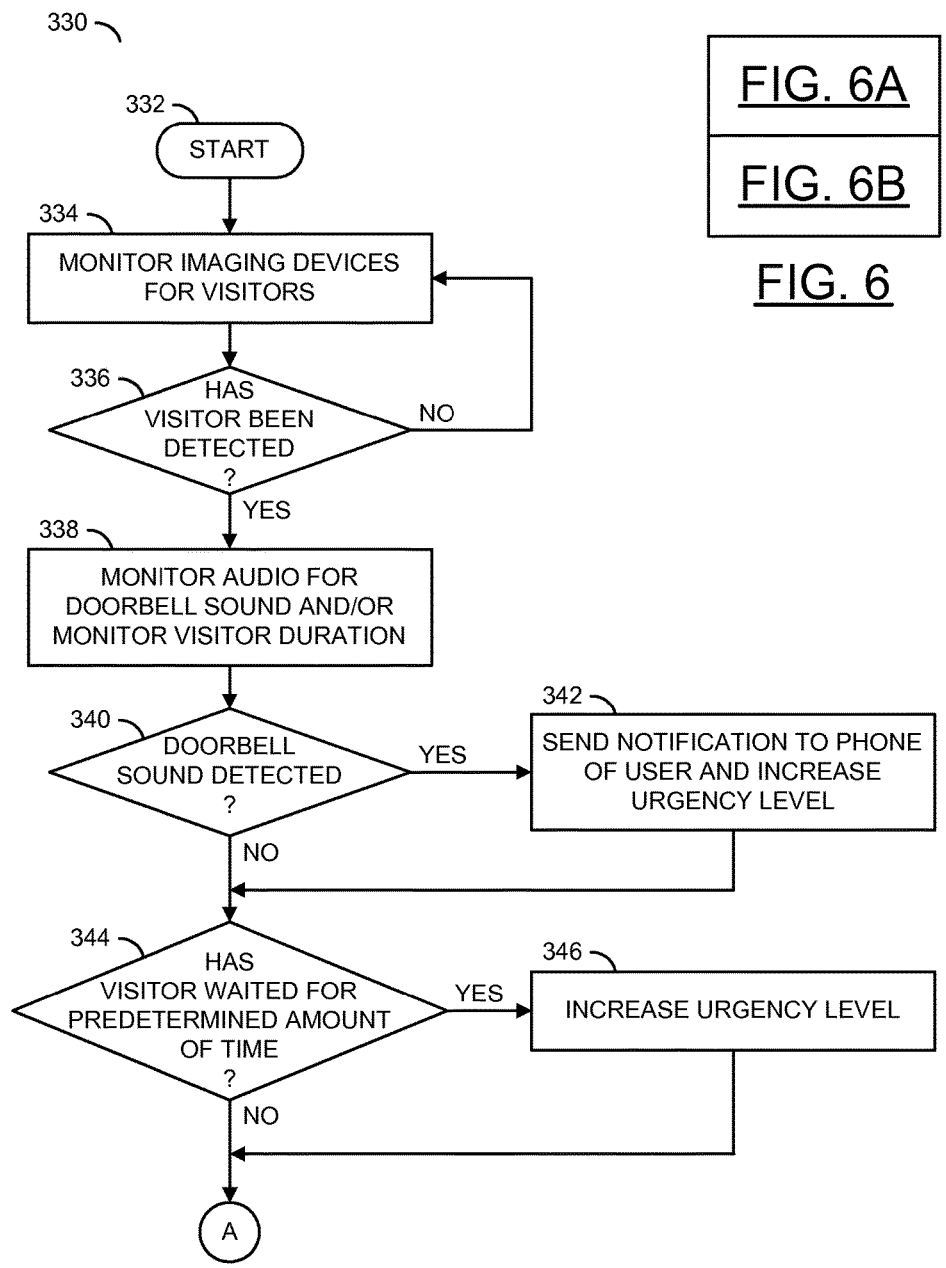
FIGS. 6A-B are flow diagrams illustrating responding to a visitor based on an urgency level.
Figure 6B:
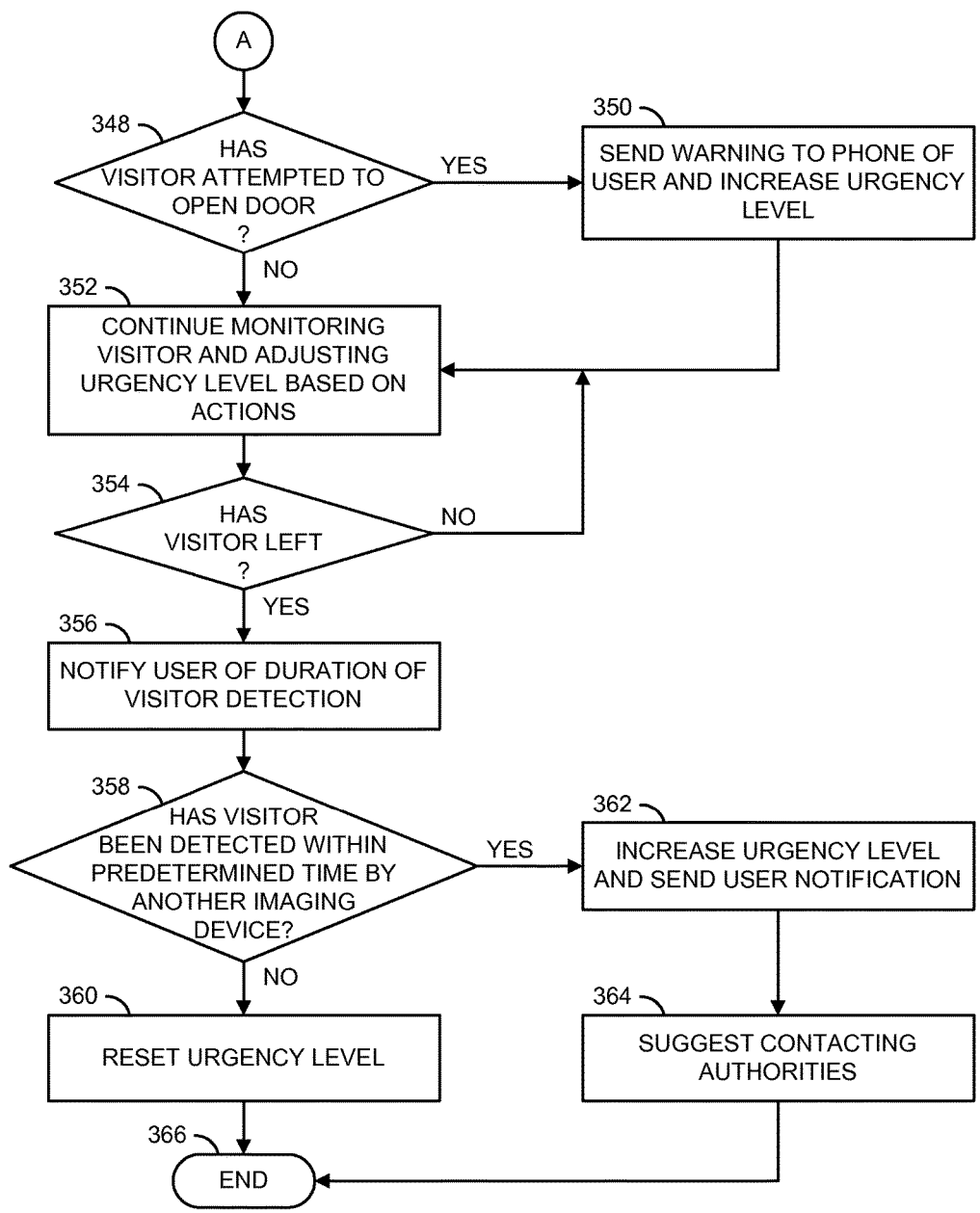

Referring to FIGS. 6A-B, a flow diagram of a method (or process) 330 is shown. The method 330 may illustrate responding to a visitor based on an urgency level. The method 330 generally comprises a step (or state) 332, a step (or state) 334, a decision step (or state) 336, a step (or state) 338, a decision step (or state) 340, a step (or state) 342, a decision step (or state) 344, a step (or state) 346, a decision step (or state) 348, a step (or state) 350, a step (or state) 352, a decision step (or state) 354, a step (or state) 356, a decision step (or state) 358, a step (or state) 360, a step (or state) 362, a step (or state) 364, and a step (or state) 366.

The state 332 may start the method 330. The state 334 may monitor imaging devices for visitors (e.g., the smart camera 102a'). Next, the method 330 may move to the decision state 336. If the decision state 336 determines a visitor has not been detected, the method 330 may return to the state 334. If the decision state 336 determines a visitor has been detected, the method 330 may move to the state 338.

The state 338 may monitor audio for a doorbell/door knock sound and/or monitor visitor duration. Next, the method 330 may move to the decision state 340. If the decision state 340 determines a doorbell/door knock sound has been detected (e.g., using the doorbell sensor 102b), the method 300 may move to the state 342. The state 342 may send a notification to the phone of the user and increase an urgency level. Next, the method 300 may move to the decision state 344. If the decision state 340 determines a doorbell/door knock sound has not been detected, the method 300 may move to the decision state 344. If the decision state 344 determines the visitor has waited a predetermined amount of time, the method 330 may move to the state 346. The state 346 may increase the urgency level. Next, the method 330 may move to the decision state 348. If the decision state 344 determines the visitor has not waited a predetermined amount of time, the method 330 may move to the decision state 348.

If the decision state 348 determines the visitor has attempted to open the door (e.g., using the door knob sensor 102c), the method 330 may move to the state 350. The state 350 may send a warning to the phone of the user and increase the urgency level. Next, the method 330 may move to the state 352. If the decision state 348 determines the visitor has not attempted to open the door, the method 330 may move to the state 352. The state 352 may continue monitoring the visitor and adjusting the urgency level based on the actions of the visitor. Next, the method 330 may move to the decision state 354. If the decision state 354 determines the visitor has not left, the method 330 may return to the state 352. If the decision state 354 determines the visitor has left, the method 330 may move to the state 356. The state 356 may notify the user of the duration of the visitor detection. Next, the method 330 may move to the decision state 358.

If the decision state 358 determines the visitor has not been detected within a predetermined amount of time by another imaging device (e.g., the smart camera 102b'), the method 330 may move to the state 360. The state 360 may reset the urgency level. Next, the method 330 may move to the state 366, which ends the method 330. If the decision state 358 determines the visitor has been detected within a predetermined amount of time by another imaging device (e.g., the smart camera 102b'), the method 330 may move to the state 362. The state 362 may increase the urgency level and send the user a notification. Next, the state 364 may suggest contacting the authorities 208. Next, the method 330 may move to the state 366, which ends the method 330.

The urgency level may represent a danger level and/or an alert level. For example, the urgency level may be numerical representation of the danger/alert level (e.g., a single number value, a numerical scale, etc.). The urgency level may be transmitted as part of the warning signal. The urgency level may be based on information detected by the detection devices 102a-102n (e.g., multiple detected signals and/or verified signals). In some embodiments, the urgency level may be based on previous user responses to an event and/or previously stored information (e.g., information about a visitor in the database 112, public information such as a known wanted criminal reported by the authorities 208, information from the cloud services 108, etc.).

Different types of behavior by a visitor may have a different impact on the urgency level. For example, a visitor touching the doorknob my result in a small increase to the urgency level. In another example, a visitor detected at two different access points of the premises may result in a large increase to the urgency level (e.g., checking multiple entrances may indicate a burglar is trying to enter the premises). Notifications may be sent and/or other event responses may be initiated based on the urgency level. The determination of the urgency level may be varied according to the design criteria of a particular implementation.

Monitoring particular types of behavior of a visitor may be optional. For example, monitoring for a doorbell and/or door knock sound (e.g., the decision state 340 and/or the state 342) be optional. Heuristics may be used and/or assumptions may be made when monitoring behavior of a visitor. For example, if the visitor stays at the access point (e.g., the front door) for more than 10 seconds an assumption may be made that the visitor has rung the doorbell and/or knocked on the door. The heuristics used and/or the assumptions made may be used to adjust the urgency level.

Figure 7:
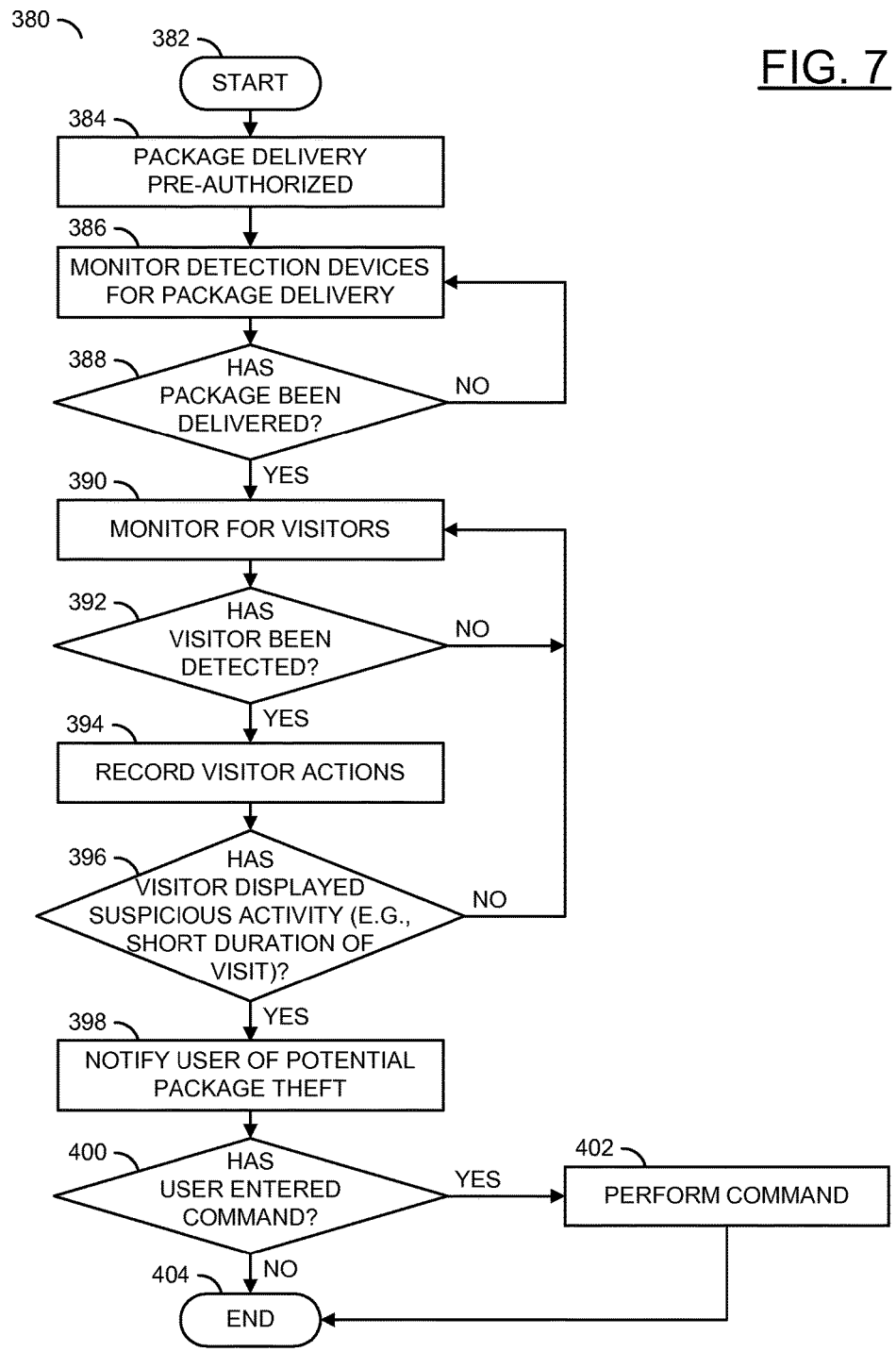
FIG. 7 is a flow diagram illustrating an example of identifying a potential package theft.

Referring to FIG. 7, a flow diagram of a method (or process) 380 is shown. The method 380 may illustrate an example of identifying a potential package theft. The method 380 generally comprises a step (or state) 382, a step (or state) 384, a step (or state) 386, a decision step (or state) 388, a step (or state) 390, a decision step (or state) 392, a step (or state) 394, a decision step (or state) 396, a step (or state) 398, a decision step (or state) 400, a step (or state) 402, and a step (or state) 404. The state 382 may start the method 380. In the state 384, a package delivery may be pre-authorized. The state 386 may monitor the detection devices 102a-102n for package delivery. Next, the method 380 may move to the decision state 388.

If the decision state 388 determines the package has not been delivered, the method 388 may return to the state 386. If the decision state 388 determines the package has been delivered, the method 380 may move to the state 390. The state 390 may monitor for visitors. Next, the method 380 may move to the decision state 392.

If the decision state 392 determines a visitor has not been detected, the method 380 may return to the state 390. If the decision state 392 determines a visitor has been detected, the method 380 may move to the state 394. The state 394 may record the actions of the visitor. Next, the method 380 may move to the decision state 396.

If the decision state 396 determines the visitor has not displayed suspicious activity, the method 380 may return to the state 390. If the decision state 396 determines the visitor has displayed suspicious activity (e.g., a short duration of visit), the method 380 may move to the state 398. The state 398 may notify the user of a potential package theft. Next, the method 380 may move to the decision state 400. If the decision state 400 determines the user has entered a command, the method 380 may move to the state 402. The state 402 may perform the command. Next, the method 380 may move to the state 404, which ends the method 380. If the decision state 400 determines the user has not entered a command, the method 380 may move to the state 404, which ends the method 380.

The user may pre-authorize a delivery of a package (e.g., indicate that a package delivery is expected). For example, tracking information for a package may indicate a package is due for delivery on a particular day. In another example, the user may pre-authorize a delivery of a package using the mobile device 106a. The user may receive a notification when the behavior of the visitor corresponds with behavior of a delivery person (e.g., knocks on the front door, waits, leaves an object at the front door, leaves after a particular amount of time, etc.).

After a package delivery has been detected, the system 100 may monitor for a potential package theft. For example, another visitor may approach the front door and quickly leave. The behavior may indicate a package theft. The user may be notified of a potential package theft. The user may review stored video footage to determine whether the package was stolen.

Figure 8:
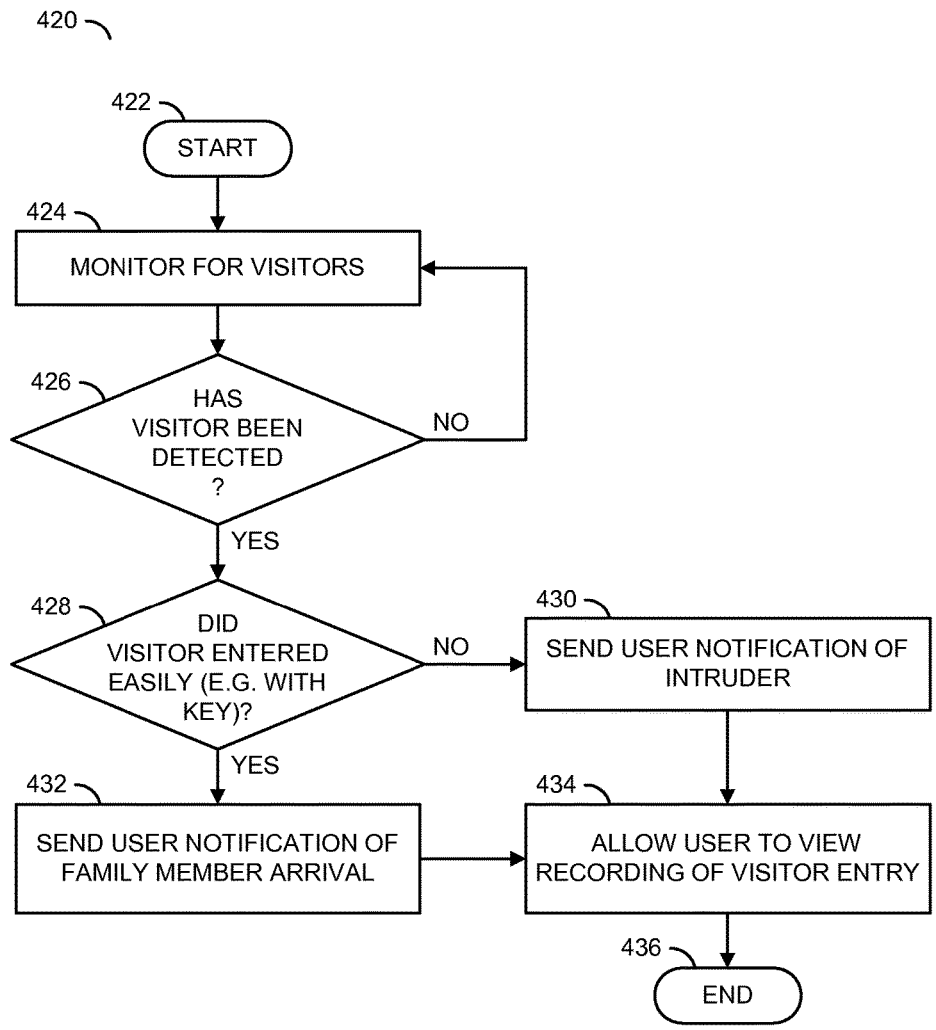
FIG. 8 is a flow diagram illustrating detecting a family member.

Referring to FIG. 8, a flow diagram of a method (or process) 420 is shown. The method 420 may illustrate detecting a family member. The method 420 generally comprises a step (or state) 422, a step (or state) 424, a decision step (or state) 426, a decision step (or state) 428, a step (or state) 430, a step (or state) 432, a step (or state) 434, and a step (or state) 436.

The state 422 may start the method 420. The state 424 may monitor for visitors (e.g., using the detection devices 102a-102n). Next, the method 420 may move to the decision state 426. If the decision state 426 determines a visitor has not been detected, the method 420 may return to the state 424. If the decision state 426 determines a visitor has been detected, the method 420 may move to the decision state 428.

If the decision state 428 determines the visitor has not entered easily, the method 420 may move to the state 430. The state 430 may send a notification of an intruder to the user. Next, the method 420 may move to the state 434. If the decision state 428 determines the visitor has entered easily (e.g., entered using a key), the method 420 may move to the state 432. The state 432 may send the user a notification of the arrival of a family member. Next, the state 434 may allow the user to view a recording of the visitor entry. Next, the method 420 may move to the state 436, which ends the method 420.

The user may define an option to receive a notification if a family member and/or domestic worker arrives. For example, a family member and/or domestic worker may have keys to the premises and be able to enter quickly. For example, a wait time may be monitored to determine how quickly a visitor has entered. In another example, if the visitor takes a long time to enter the premises then the user may be sent a notification of a potential intruder. In yet another example, if the visitor cannot enter the premises and waits a long time then the user may be sent a notification and video (e.g., the video may indicate that a family member lost their keys and is unable to get inside).

Figure 9:
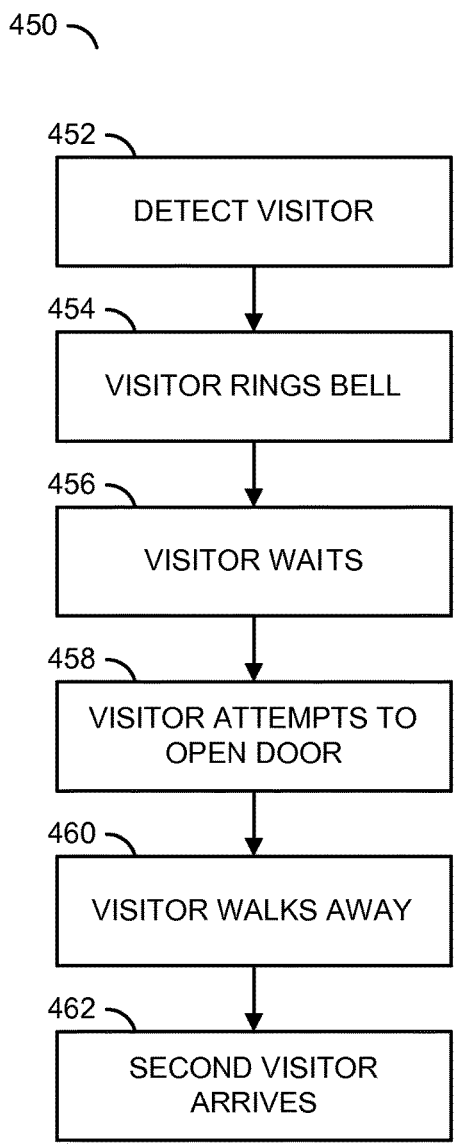
FIG. 9 is a flow diagram illustrating how a potential burglar is identified.

Referring to FIG. 9, a flow diagram of a method (or process) 450 is shown. The method 450 may illustrate how a potential burglar is identified. The method 450 generally comprises a step (or state) 452, a step (or state) 454, a step (or state) 456, a step (or state) 458, a step (or state) 460, and a step (or state) 462. The step 452 may determine if a visitor is detected at the door by the imaging detector (e.g., one of the smart cameras 102a'-102n'). The step 454 may determine if the visitor rang the doorbell (e.g., one or more times). For example, an audio signal may be detected by a sensor (e.g., the doorbell sensor 102b). In some embodiments, a signal (e.g., the warning signal) may initiate sending a notification to a cell phone of the user (e.g., the mobile device 106a).

The step 456 may determine if the visitor waited for a predetermined amount of time (e.g., about 60 seconds). The user may view a live stream of the visitor using the mobile device 106a (e.g., using the video playback interface 284). The step 458 may determine if the visitor attempted to open the door and/or touched the door knob (e.g., a notification warning signal may be sent to the cell phone of the user indicating there is probable cause to call the authorities 208). The step 460 may determine if the visitor could not open the front door and walked away. The wait duration of the visitor at the front door may be noted by the processing circuits 104a-104n and a report notification may be sent to the homeowners.

The step 462 may determine if within 10 minutes, a second one of the sensors 102a-102n (e.g., located at another access point such as the back door) detected a visitor. A warning signal may be sent to the mobile device 106a of the homeowner and/or the central monitoring service 206. By viewing the video/images, the user and/or the central monitoring service 206 may determine if the same visitor is present. A probable cause may exist to call the authorities 208, use the intercom 106b to talk down the potential burglar and/or activate the deterrent device 106c.

Figure 10:
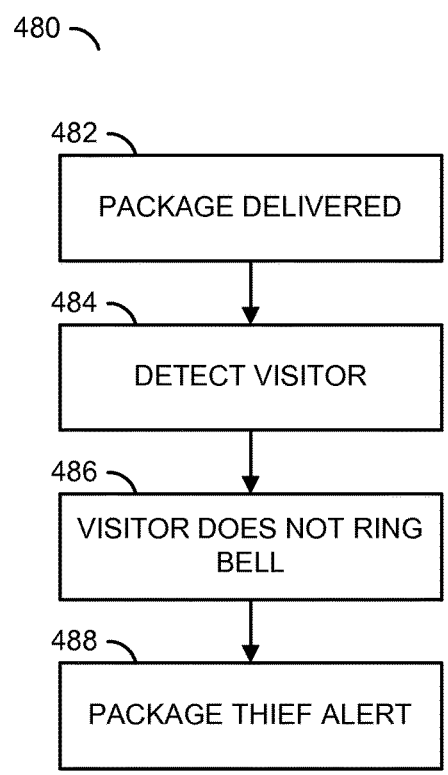
FIG. 10 is a flow diagram illustrating how a package theft is identified.

Referring to FIG. 10, a flow diagram of a method (or process) 480 is shown. The method 480 may illustrate how a package theft is identified. The method 480 generally comprises a step (or state) 482, a step (or state) 484, a step (or state) 486, and a step (or state) 488. The step 482 may determine if prior to the detected visitor, the homeowner is aware of a likelihood of a package being delivered to the premises (e.g., based on UPS tracking information, a delivery notification, a package delivery detected by the detection devices 102a-102n, etc.).

The step 484 may determine if a visitor is detected at the door by the imaging detector (e.g., integrated in one of the sensors 102a-102n). The step 486 may determine if the visitor did not ring the doorbell or knock on the door, and that the visitor stayed for a small amount of time (e.g., for less than 5 seconds). A warning notification may be sent to the cell phone of the homeowner (e.g., the mobile device 106a). The notification may indicate that a suspicious visitor arrived and there may be a potential package theft. The system 100 may also provide an image and/or video of the suspicious event. In some embodiments, the step 488 may determine if the homeowner initiated a command (e.g., using command interface options 258a-258e) to activate the deterrent device 106c (e.g., sound a siren and/or a play a pre-recorded voice message) to deter the potential package thief, at the risk of a false alarm for a friendly visitor.

Figure 11:
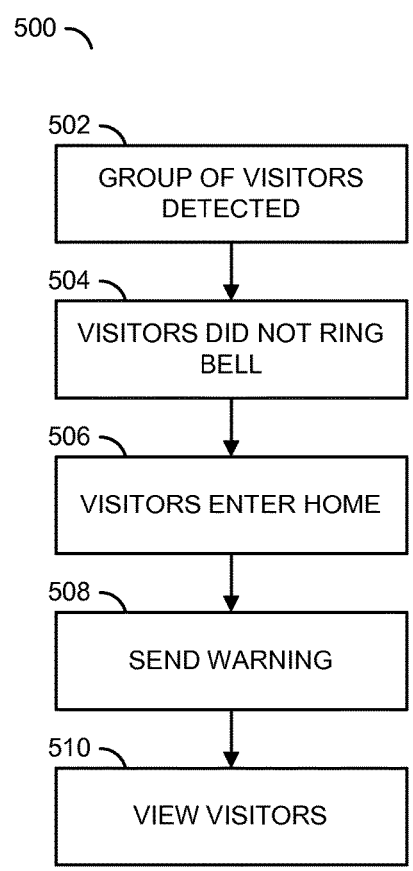
FIG. 11 is a flow diagram illustrating how an expected group is monitored.

Referring to FIG. 11, a flow diagram of a method (or process) 500 is shown. The method 500 may illustrate how an expected group is monitored. The method 500 generally comprises a step (or state) 502, a step (or state) 504, a step (or state) 506, a step (or state) 508, and a step (or state) 510. The step 502 may determine if a group of visitors has been detected (e.g., using voice recognition and/or imaging) at an access point (e.g., the front door). The step 504 may determine if the visitors did not ring the doorbell or knock on the door (e.g., entry was attempted without announcing presence).

The step 506 may determine if the visitors entered the home in less than 15 seconds (e.g., had key access). The step 508 may send a warning notification to the cell phone of the homeowner (e.g., the mobile device 106a). For example, the homeowner may have programmed a preference to receive a notification when a child of the homeowner arrives home (e.g., the homeowner may expect his/her teenage child to come home alone, not with a group of friends). The step 510 may determine if the homeowner can view the recorded visitation within 15 seconds to verify the situation (e.g., view a recording of the arrival of the group of friends on the video playback interface 254).

Figure 12:
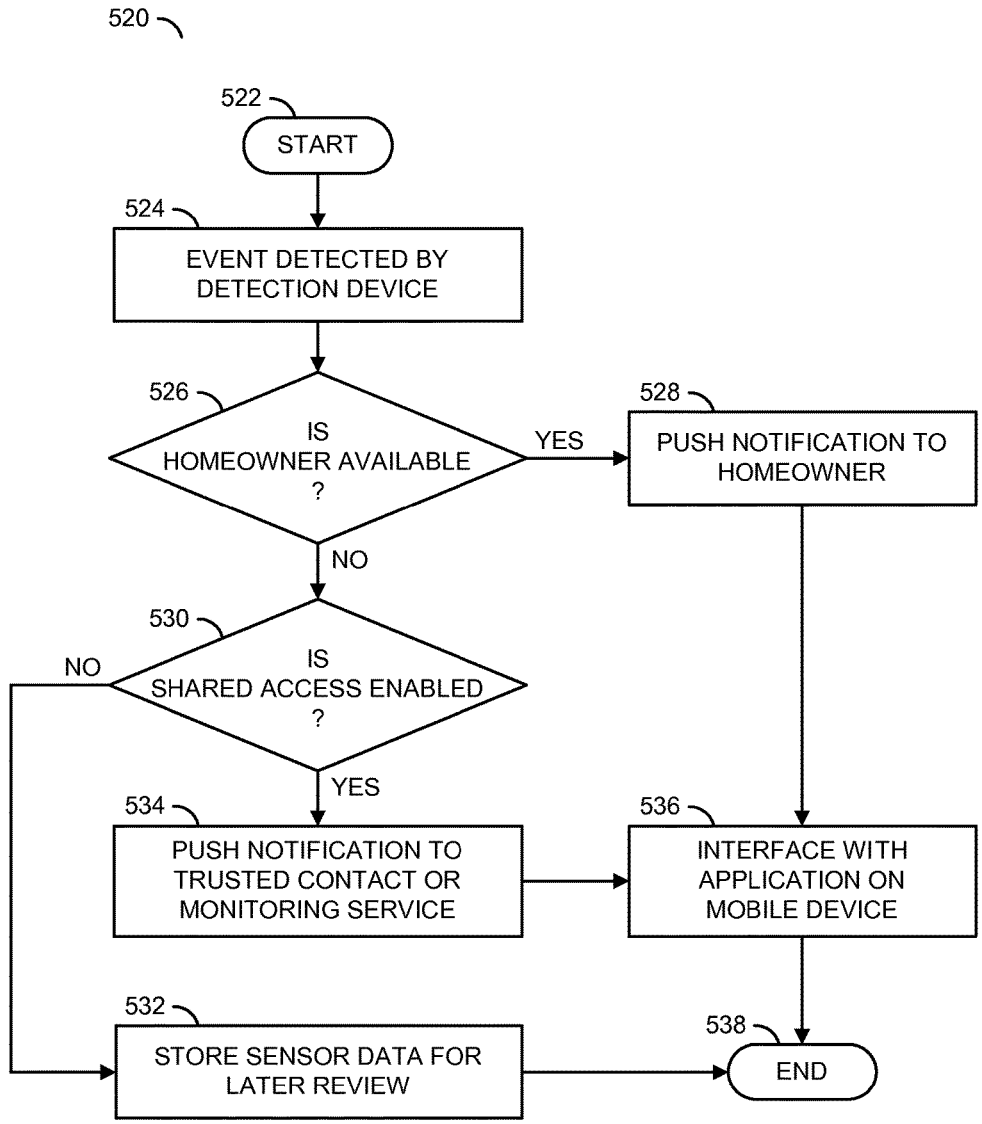
FIG. 12 is a flow diagram illustrating shared access to monitoring data.

Referring to FIG. 12, a flow diagram of a method (or process) 520 is shown. The method 520 may illustrate an example of shared access to monitoring data. The method 520 generally comprises a step (or state) 522, a step (or state) 524, a decision step (or state) 526, a step (or state) 528, a decision step (or state) 530, a step (or state) 532, a step (or state) 534, a step (or state) 536, and a step (or state) 538.

The state 522 may start the method 520. In the state 520, an event may be detected by one of the detection devices 102a-102n. Next, the method 520 may move to the decision state 526. If the decision state 526 determines the homeowner is available, the method 520 may move to the state 528. The state 528 may push a notification to the homeowner (e.g., on the mobile device 106a). Next, the method 520 may move to the state 536. If the decision state 526 determines the homeowner is not available, the method 520 may move to the decision state 530.

If the decision state 530 determines shared access is not enabled, the method 520 may move to the state 532. The state 532 may store the sensor data for later review. Next, the method 520 may move to the state 538, which ends the method 520. If the decision state 530 determines shared access is enabled, the method 520 may move to the state 534. The state 534 may push a notification to a trusted contact and/or the monitoring service 206. Next, the state 536 may allow an interface with the application on the mobile device 106a (e.g., the video playback interface 254 and/or the command interface options 258a-258e). Next, the method 520 may move to the state 538, which ends the method 520.

The user/homeowner may share access to the system 100 with a trusted contact (e.g., a neighbor, a friend, a business partner, etc.). For example, the user may be on vacation and a neighbor may watch the premises using the system 100. In another example, shared access may be provided to the monitoring service 206. The user may enable shared access to particular features and/or data from the system 100. For example, the user may select a trusted contact to receive notifications from a smoke detector, but not receive video from the smart camera 102a'.

Figure 13:
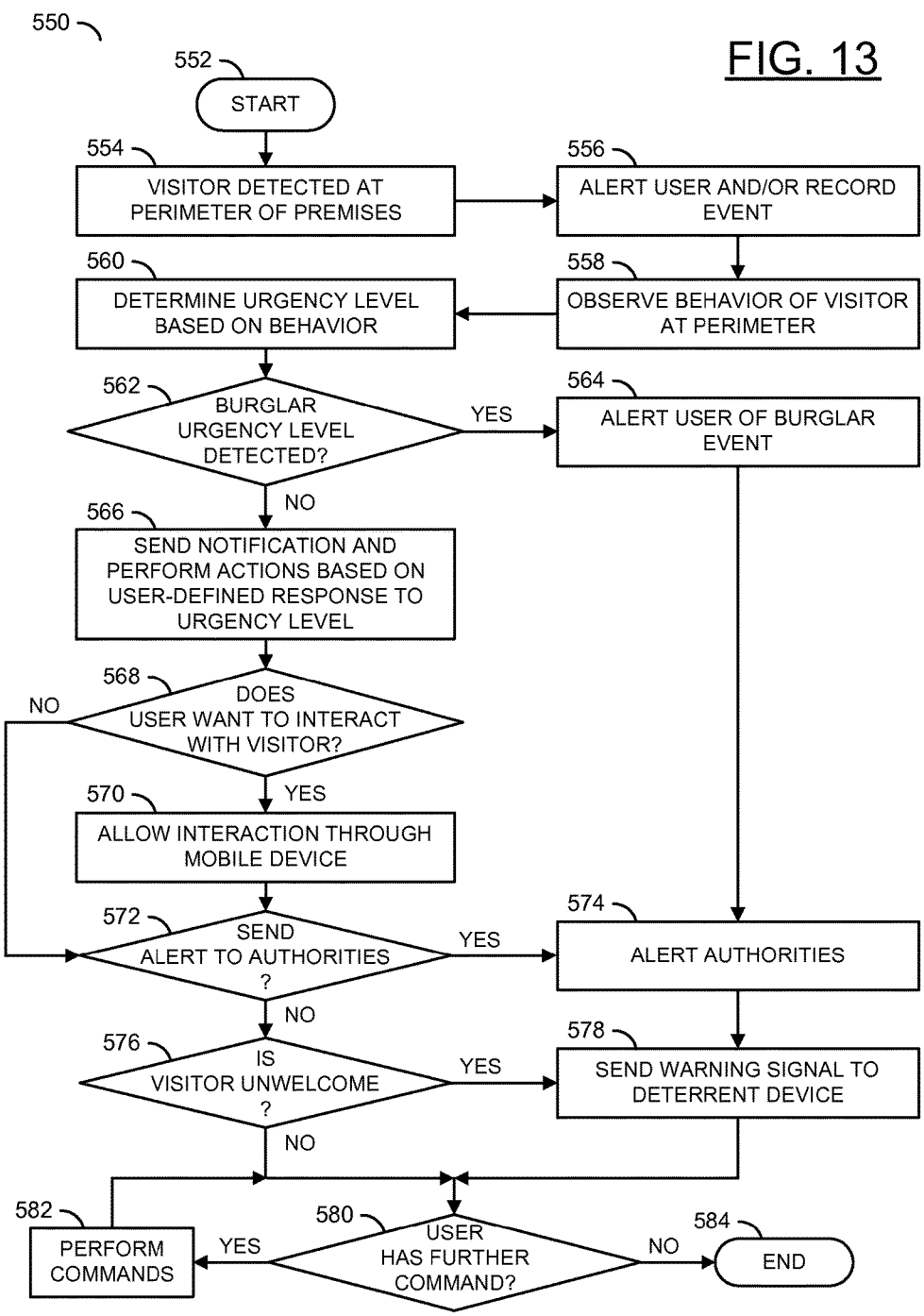
FIG. 13 is a flow diagram illustrating interaction with a visitor based on a behavior type.

Referring to FIG. 13, a flow diagram of a method (or process) 550 is shown. The method 550 may illustrate an example of interaction with a visitor based on a behavior type. The method 550 generally comprises a step (or state) 552, a step (or state) 554, a step (or state) 556, a step (or state) 558, a step (or state) 560, a decision step (or state) 562, a step (or state) 564, a step (or state) 566, a decision step (or state) 568, a step (or state) 570, a decision step (or state) 572, a step (or state) 574, a decision step (or state) 576, a step (or state) 578, a decision step (or state) 580, a step (or state) 582, and a step (or state) 584.

The state 552 may start the method 550. In the state 554, a visitor may be detected at the perimeter of the premises. Next, the state 556 may alert the user (e.g., send a notification) and/or record the event. The state 558 may observe the behavior of the visitor at the perimeter. The state 560 may determine the urgency level based on the behavior of the visitor. Next, the method 550 may move to the decision state 562.

If the decision state 562 determines a burglar urgency level is detected, the method 550 may move to the state 564. The state 564 may alert the user of a burglar event. Next, the method 550 may move to the state 574. If the decision state 562 determines a burglar urgency level has not been detected, the method 550 may move to the state 566. The state 566 may send a notification and/or perform actions based on a user-defined response to the urgency level. Next, the method 550 may move to the decision state 568.

If the decision state 568 determines the user does want to interact with the visitor (e.g., based on input from the speak command 258a), the method 550 may move to the state 570. The state 570 may allow interaction through the mobile device 106a. Next, the method 550 may move to the decision state 572. If the decision state 568 determines the user does not want to interact with the visitor, the method 550 may move to the decision state 572.

If the decision state 572 determines to send an alert to the authorities 208 (e.g., using the security options command 258d), the method 550 may move to the state 574. The state 574 may alert the authorities 208. Next, the method 550 may move to the state 578. If the decision state 572 determines not to alert the authorities 208, the method 550 may move to the decision state 576.

If the decision state 576 determines the visitor is unwelcome, the method 550 may move to the state 578. The state 578 may send a warning signal to the deterrent device 106c. Next, the method 550 may move to the decision state 580. If the decision state 576 determines the visitor is not unwelcome, the method 550 may move to the decision state 580.

If the decision state 580 determines the user has further commands (e.g., input from the command options 258a-258e), the method 550 may move to the state 582. The state 582 may perform the commands. Next, the method 582 may return to the decision state 580. If the decision state 580 determines the user does not have further commands, the method 550 may move to the state 584, which ends the method 550.

The system 100 may characterize the behavior of a visitor and/or notable event. The behavior and/or event may be characterized by the urgency level. The system 100 may perform a response automatically based on the characterization (e.g., automatically alerting the authorities 208 when burglar behavior is verified). The system 100 may wait for instructions from the user and/or trusted contact before performing an event response. For example, the user may interact with the visitor and/or attempt to deter an unwelcome visitor before alerting the authorities 208.

The visitor may be an animal. The system 100 may be configured to playback audio signals that may lure animals and/or deter animals. A notification may be sent to the user when an animal is detected. The system 100 may wait for commands from a user before performing an event response to an animal. For example, a cat may be an unwelcome visitor to some homeowners and the homeowner may want to play a loud sound to scare away the cat. In another example, a cat may be a welcome visitor to some homeowners and the homeowner may want to play a welcoming sound to a cat and record video of the event.

Figure 14:
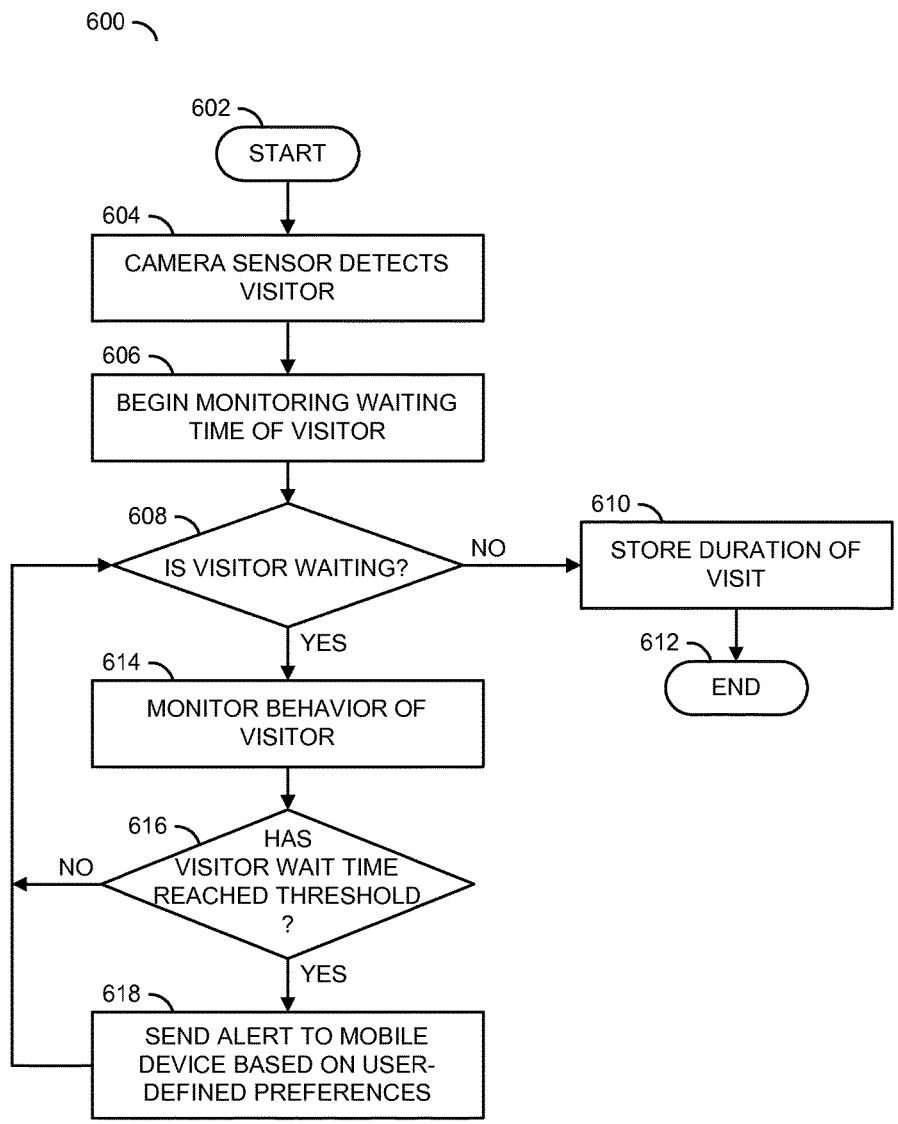
FIG. 14 is a flow diagram illustrating determining a wait time of a visitor.

Referring to FIG. 14, a flow diagram of a method (or process) 600 is shown. The method 600 may illustrate an example of determining a wait time of a visitor. The method 600 generally comprises a step (or state) 602, a step (or state) 604, a step (or state) 606, a decision step (or state) 608, a step (or state) 610, a step (or state) 612, a step (or state) 614, a decision step (or state) 616, and a step (or state) 618.

The state 602 may start the method 600. In the state 604, the camera sensor 102a' may detect a visitor. The state 606 may begin monitoring a waiting time of the visitor. Next, the method 600 may move to the decision state 608. If the decision state 608 determines the visitor is not waiting, the method 600 may move to the state 610. The state 610 may store the duration of the visit. Next, the method 600 may move to the state 612, which ends the method 600. If the decision state 608 determines the visitor is waiting, the method 600 may move to the state 614.

The state 614 may monitor the behavior of the visitor (e.g., determine the urgency level of the event). Next, the method 600 may move to the decision state 616. If the decision state 616 determines the visitor wait time has not reached a threshold, the method 600 may return to the decision state 608. If the decision state 616 determines the visitor wait time has reached a threshold, the method 600 may move to the state 618. The state 618 may send an alert to the mobile device 106a based on the user-defined preferences. Next, the method 600 may return to the decision state 608.

The wait time of a visitor may be detected using one of the detection devices 102a-102n. For example, the camera sensor 102a' may detect the wait time of the visitor. In some embodiments, another sensor (e.g., a PIR sensor) may improve accuracy of determining the wait time. For example, the wait time may provide useful information to differentiate between residents, delivery people and/or other types of visitors. For example, a mail carrier may only wait a short amount of time (e.g., less than 5 second wait time). In another example, a resident may enter the premises easily with a key (e.g., less than 10 second wait time). In yet another example, a solicitor may wait a long time at the door (e.g., more than 30 seconds).

The wait time may be used to determine the urgency level of the event. The user may pre-configure options to receive notifications based on the wait time of a visitor. For example, the user may choose not to receive a notification if the visitor does not stay for more than 15 seconds. The user may select different notification types for different wait time thresholds (e.g., a unobtrusive notification if the wait time is greater than 15 seconds, an aggressive notification if the wait time is greater than 30 seconds, etc.).

Figure 15:
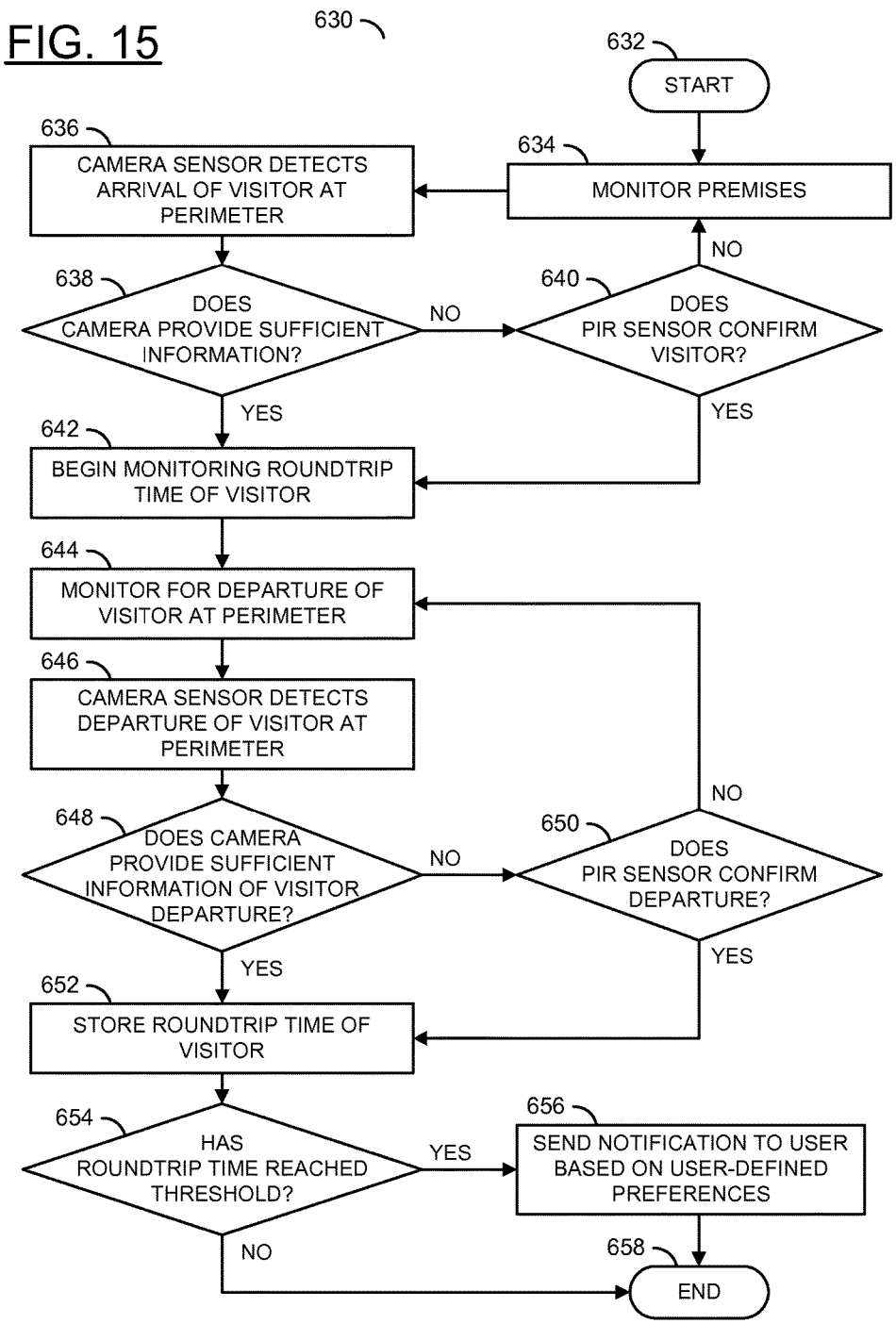
FIG. 15 is a flow diagram illustrating determining a round trip time of a visitor.

Referring to FIG. 15, a flow diagram of a method (or process) 630 is shown. The method 630 may illustrate an example of determining a round trip time of a visitor. The method 630 generally comprises a step (or state) 632, a step (or state) 634, a step (or state) 636, a decision step (or state) 638, a decision step (or state) 640, a step (or state) 642, a step (or state) 644, a step (or state) 646, a decision step (or state) 648, a decision step (or state) 650, a step (or state) 652, a decision step (or state) 654, a step (or state) 656, and a step (or state) 658.

The state 632 may start the method 630. Next, the state 634 may monitor the premises. In the state 636, the camera sensor (e.g., the camera sensor 102a') may detect the arrival of a visitor at the perimeter of the premises. Next, the method 630 may move to the decision state 638.

If the decision state 638 determines the camera 102a' does not provide sufficient information (e.g., to verify an arrival of the visitor), the method 630 may move to the decision state 640. If the decision state 638 determines the camera does provide sufficient information, the method 630 may move to the state 642. If the decision state 640 determines the PIR sensor does not confirm the visitor, the method 630 may return to the state 634. If the PIR sensor does confirm the visitor the method 630 may move to the state 642.

The state 642 may begin monitoring a round trip time of the visitor. Next, the state 644 may monitor for departure of the visitor at the perimeter. In the state 646, the camera sensor (e.g., the camera sensor 102a') may detect a departure of the visitor at the perimeter. Next, the method 630 may move to the decision state 648.

If the decision state 648 determines the camera does not provide sufficient information of the visitor departure, the method 630 may move to the decision state 650. If the decision state 648 determines the camera does provide sufficient information of the visitor departure, the method 630 may move to the state 652. If the decision state 650 determines the PIR sensor does not confirm the departure of the visitor, the method 630 may return to the state 644. If the decision state 650 determines the PIR sensor does confirm the departure of the visitor, the method 630 may move to the state 652.

The state 652 may store the round trip time of the visitor. Next, the method 630 may move to the decision state 654. If the decision state 654 determines the round trip time has reached a threshold, the method 630 may move to the state 656. The state 656 may send a notification to the user based on the user-defined preferences. Next, the method 630 may move to the state 658, which ends the method 630. If the decision state 654 determines the round trip time has not reached a threshold, the method 630 may move to the state 658, which ends the method 630.

The round trip time of a visitor may be detected using one of the detection devices 102a-102n. For example, the camera sensor 102a' may detect the round trip time of the visitor. In some embodiments, another sensor (e.g., a PIR sensor) may improve accuracy of determining the round trip time. For example, the round trip time may provide useful information to differentiate between residents, delivery people and/or other types of visitors. For example, a mail carrier may have a short round trip time (e.g., less than 10 second round trip time). In another example, a resident may enter the premises and not leave for a long time (e.g., an indeterminate round trip time).

Some visitors may not walk to an access point monitored by the detection devices 102a-102n. For example, a water meter reader may be detected at the perimeter of the premises, but may not be detected at the front entrance (e.g., the water meter may be at a side of a home that does not have an access point). The system 100 may not have continuous information about the visitor (e.g., the visitor is not in view of the smart cameras 102a'-102n') making determining a wait time and/or behavior difficult. However, the visitor may be detected again leaving the premises. The difference between be arrival time and the departure time may be used to determine the round trip time. For example, the water meter reader may leave the premises and be detected at the perimeter of the premises (e.g., a 30 second round trip time).

In some embodiments, the round trip time of the visitor may be determined by arrival and/or departure time from different access points. For example, the mail carrier may enter the premises and be detected by the smart camera 102a' and may leave the premises and be detected by the smart camera 102b' (e.g., the mail carrier walks across the premises to deliver mail to a neighboring home). In another example, multiple round trips may indicate that a family member is carrying goods into the home (e.g., making multiple trips to the front door and a car to bring in groceries).

The round trip time may be used to determine the urgency level of the event. The user may pre-configure options to receive notifications based on the round trip time of a visitor. For example, the user may want to receive a notification if the mail carrier has delivered the mail (e.g., a short round trip time). The user may select different notification types for different round trip time thresholds.

Figure 16:
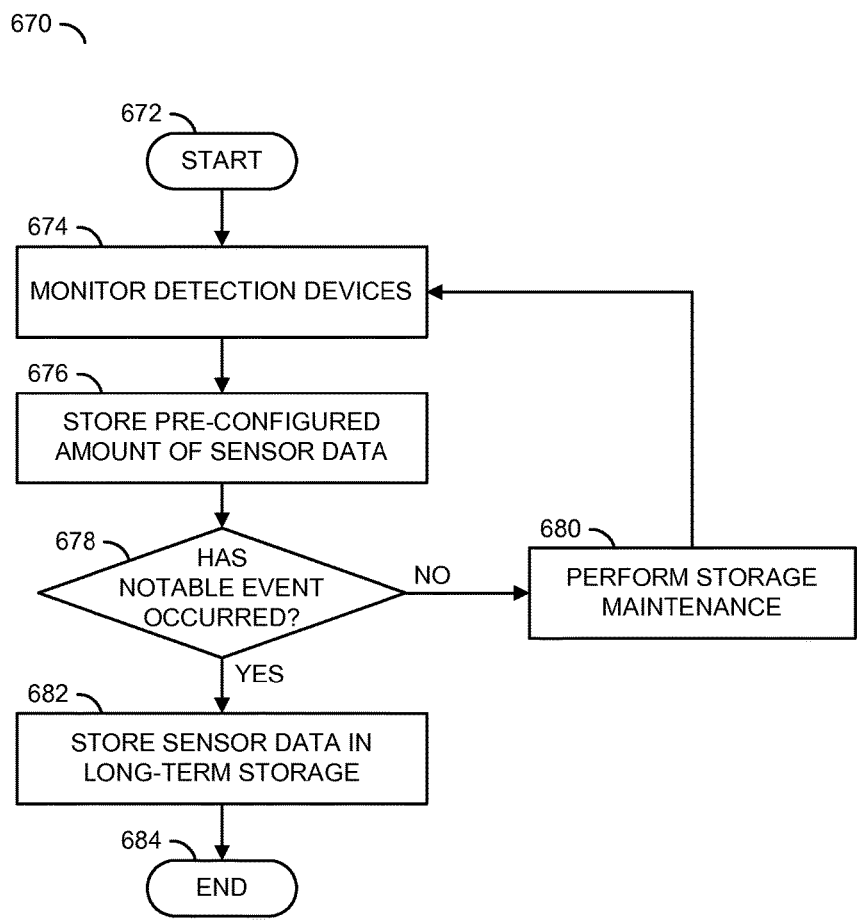
FIG. 16 is a flow diagram illustrating storage maintenance based on event occurrence.

Referring to FIG. 16, a flow diagram of a method (or process) 670 is shown. The method 670 may illustrate an example of storage maintenance based on event occurrence. The method 670 generally comprises a step (or state) 672, a step (or state) 674, a step (or state) 676, a decision step (or state) 678, a step (or state) 680, a step (or state) 682, and a step (or state) 684.

The state 672 may start the method 670. Next, the step 674 may monitor the detection devices 102a-102n. The step 676 may store a pre-configured amount of sensor data from the detection devices 102a-102n. Next, the method 670 may move to the decision state 678.

If the decision state 678 determines a notable event has not occurred, the method 670 may move to the state 680. In the state 680, the system 100 may perform storage maintenance. Next, the method 670 may return to the state 674. If the decision state 670 determines a notable event has occurred, the method 670 may move to the state 682. In the state 682, the system 100 may store the sensor data in long-term storage. Next, the method 670 may move to the state 684, which ends the method 670.

The system 100 may store information (e.g., sensor data) detected by the detection devices 102a-102n. The amount of information detected may have a large file size (e.g., high-definition video from the smart cameras 102a'-102n'). For example, the information may be stored in an internal storage of the system 100, a removable storage (e.g., a hard drive, a solid-state drive, a memory card, etc.). For example, each of the detection devices 102a-102n may have a removable memory card.

The system 100 may not need to be configured to store all the detected sensor data. In some embodiments, the system 100 may buffer a pre-configured amount of data. In one example, the system 100 may store 8 GB of data. In another example, the system 100 may store a user-defined number of hours worth of data (e.g., 2 hours of sensor data). If a notable event does not occur within the pre-configured amount of time, the system 100 may perform storage maintenance. For example, the system 100 may delete the stored sensor data and/or over-write the stored sensor data with new sensor data (e.g., implement a circular buffer). If a notable event does occur within the pre-configured amount of time, the system 100 may store the sensor data in a long-term storage device (e.g., send the data to the database 112). The user and/or the authorities 208 may review the sensor data in the database 112 and delete sensor data after review. The system 100 may perform storage maintenance to ensure notable events are capable of being reviewed and/or to ensure storage space is available to record data in real-time.

The system 100 may eliminate about half of the cost of conventional security monitoring systems due to an innovative sales channel with the light fixture industry. Two of the largest cost components of a conventional security monitoring contract may be eliminated (e.g., direct sales and/or professional installation). Implementing the system 100 with a monitoring service having a business contract with a month to month service agreement may be profitable for the entire food chain of the monitoring service industry from hardware manufacturers (e.g., the light fixture industry), software developers, monitoring service providers (e.g., the monitoring service 206) and/or retail channels. Conventional security monitoring systems and/or alternatives to the system 100 may not be practical because they may cost users twice as much and have clumsy implementation and/or less effectiveness.

The system 100 may be configured to provide verification of an event for the authorities 208. A probable concern dispatch may be sent to the authorities 208 (e.g., to dispatch police) may be provided with or without images of the event. The system 100 may be a trusted source of an alarm based on automatic detection of a visitor/event at an access point for a pre-determined amount of time (e.g., detected for over a few seconds by the smart camera 102a' and/or the pressure sensor 102d underneath the doormat 154).

Further information may be incorporated to verify the detection of a visitor/event such as whether on not the visitor rang the doorbell and/or knocked at the door one or more times (e.g., by sound and/or an electrical signal from the doorbell sensor 102b), whether the doorknob has been touched (e.g., by the door knob sensor 102c), automatic detection of a person at an access point for over a few seconds, and/or whether a similar person (e.g., a visitor identified as having the same appearance by facial recognition using the smart cameras 102a'-102n') has been detected at another door or window within several minutes of time.

A help signal may be sent to the homeowner, his/her neighbors, friends, the monitoring service 206, and/or the authorities 208. The help signal may indicate imminent danger to the homeowner and/or premises. The detected sensor data may verify the imminent danger with or without images of the event.

The system 100 may allow the homeowner to configure a customized probable concern notification to dispatch police (e.g., the authorities 208), neighbors and/or friends about an imminent danger, based on the detected signals from the detection devices 102a-102n. The homeowner may customize probable concern notifications for different scenarios. For example, the homeowner may have one notification during a vacation (e.g., defined as a period of days). In another example, the homeowner may have one notification type during sleep hours (e.g., 11 pm to 6 am) and another notification type during work hours (e.g., 8 am to 5 pm). In yet another example, the homeowner may have another type of notification when a person is detected at two access points (e.g., doors and/or windows) within a period of 5 minutes. The basis for a notification may be varied according to the design criteria of a particular implementation.

The smart camera 102a' may be configured to capture images and/or detect motion. A behavior of the visitor may be determined based on captured images and/or detected motion (e.g., recorded video). The behavior of the visitor may be compared to known types of visitor behavior and/or motion. For example, the known types of visitor behavior and/or motion may be an expected wait time and/or round trip time. The processing circuits 104a-104n may be configured to perform an event response based on the comparison of the detected images/motion and the known types of visitor behavior and/or motion.

The functions performed by the diagrams of FIGS. 5-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (vDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a camera configured to generate a first signal by capturing an area around an access point of a premises;
   a second detection device configured to generate a second signal in response to a second type of input; and
   a processing circuit configured to (i) receive said first signal from said camera and said second signal from said second detection device, (ii) combine data from both (a) said first signal and (b) said second signal to characterize a behavior of a visitor, (iii) determine a category of said visitor based on said characterization of said behavior and (iv) generate a warning signal in response to said category of said visitor, wherein said category of said visitor comprises one or more of the group consisting of (i) a potential burglar, (ii) a solicitor, (iii) a delivery worker, (iv) a resident, (v) a domestic helper, (vi) a stranger, (vii) a friendly visitor with access to said premises and (viii) a friendly visitor without access to said premises.

2. The apparatus according to claim 1, wherein said second detection device is a second camera configured to monitor a second access point of said premises.

3. The apparatus according to claim 1, wherein said second detection device comprises one of (i) an indoor connected security camera, (ii) an output door light fixture, (iii) an outdoor doorbell, (iv) a pressure sensor, (v) a contact sensor, (vi) a two-way intercom and (vii) an indoor camera looking outside of a house looking through a window.

4. The apparatus according to claim 1, wherein (i) said warning signal is sent to a mobile device and (ii) said mobile device is configured to play a live video stream from said camera.

5. The apparatus according to claim 1, further comprising an intercom integrated with the processing circuit, wherein (i) said warning signal is sent to said intercom to trigger a pre-recorded message, (ii) said pre-recorded message is selected from a collection of messages based on said category of said visitor, (iii) said message is pre-recorded by a user or a manufacturer and (iv) said pre-recorded message comprises a human voice, an alarm, music, a barking dog, welcoming sounds, and deterring sounds.

6. The apparatus according to claim 1, wherein (i) said warning signal is sent to a deterrent device to drive away an unwelcome visitor and (ii) said deterrent device is at least one of (a) a siren device configured to generate a siren sound compliant with regulations and (b) a light bulb configured to flash at a particular frequency for varying durations to generate a distress signal.

7. The apparatus according to claim 1, wherein said processing circuit is configured to calculate an urgency level based on (i) said characterization of said behavior, (ii) said category of said visitor and (iii) previous responses to a type of event.

8. The apparatus according to claim 7, wherein a notification is sent to authorities based on said urgency level.

9. The apparatus according to claim 7, wherein a distress signal is sent to (i) a homeowner, (ii) a trusted neighbor, (iii) a friend, (iv) a monitoring service and (v) authorities based on said urgency level.

10. The apparatus according to claim 7, wherein said apparatus is configured to allow a user to create a custom response to said event based on said urgency level.

11. The apparatus according to claim 1, wherein said apparatus comprises a plurality of said processing circuits.

12. The apparatus according to claim 1, wherein performing said characterization of said behavior of said visitor enables said apparatus to be active without manually arming and disarming said apparatus.

13. The apparatus according to claim 1, wherein combining said data and characterizing said behavior of said visitor enables said processing circuit to (i) verify an event and (ii) prevent false alarms by presenting said warning signal to authorities after said event has been verified.

14. The apparatus according to claim 1, wherein combining said data comprises implementing sensor fusion using multiple sensory signals.

15. The apparatus according to claim 1, wherein said characterization is based on a detected round trip time of said visitor compared with a stored expected round trip time.

16. The apparatus according to claim 15, wherein determining said detected round trip time comprises (i) detecting an arrival of said visitor at a perimeter of said premises using at least one of said camera and said second detection device and (ii) detecting a departure of said visitor at said perimeter of said premises using at least one of said camera and said second detection device.

17. The apparatus according to claim 15, wherein (i) said round trip time is used to differentiate between types of said visitors, (ii) a comparison with said stored expected round trip time is based on said type of said visitor and information about said visitor stored in a database, (iii) said detected round trip time is based on a difference between an arrival time and a departure time of said visitor and (iv) said arrival time is detected using said camera at said access point and said departure time is determined using said second detection device at a second access point.

18. An apparatus comprising:
    a camera configured to generate a detection signal in response to a motion detected in an area monitored by said camera; and
    a processing circuit configured to (i) confirm whether a visitor has arrived in said area monitored by said camera if said detection signal does not provide sufficient information (ii) if said visitor has arrived, classify a behavior of said visitor, (iii) adjust an urgency level based on said behavior of said visitor and (iv) generate a warning signal in response to said urgency level, wherein said classification of said visitor comprises one or more of the group consisting of (i) a potential burglar, (ii) a solicitor, (iii) a delivery worker, (iv) a resident, (v) a domestic helper, (vi) a stranger, (vii) a friendly visitor with access to a premises and (viii) a friendly visitor without access to said premises.

19. The apparatus according to claim 18, wherein said classification is further based on detecting a round trip time of said visitor by (i) detecting an arrival of said visitor at said area using said camera and (ii) detecting a departure of said visitor from said area using said camera.

20. The apparatus according to claim 18, wherein said processing circuit is implemented as one of a plurality of processing circuits implemented using distributed processing in a cloud service.

* * * * *